United States Patent
Ouchi

(10) Patent No.: US 7,831,716 B2
(45) Date of Patent: Nov. 9, 2010

(54) SERVER THAT PROVIDES A PLURALITY OF TYPES OF CONTENT TO ANOTHER DEVICE AND METHOD FOR CONTROLLING THE SERVER

(75) Inventor: Masatomo Ouchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 781 days.

(21) Appl. No.: 11/780,047

(22) Filed: Jul. 19, 2007

(65) Prior Publication Data

US 2008/0028310 A1    Jan. 31, 2008

(30) Foreign Application Priority Data

Jul. 31, 2006    (JP) .............................. 2006-208497

(51) Int. Cl.
*G06F 15/16*    (2006.01)
(52) U.S. Cl. ........................ 709/227; 709/203; 709/217; 709/225
(58) Field of Classification Search ................. 709/203, 709/217, 225, 227
See application file for complete search history.

(56) References Cited

U.S. PATENT DOCUMENTS

| | | | |
|---|---|---|---|
| 7,206,840 B2 * | 4/2007 | Choi et al. ................... | 709/225 |
| 7,221,667 B2 | 5/2007 | Hori et al. | |
| 7,382,756 B2 * | 6/2008 | Barber et al. ................ | 370/338 |
| 7,602,759 B2 * | 10/2009 | Kondo ......................... | 370/338 |
| 2005/0174962 A1 * | 8/2005 | Gurevich ..................... | 370/328 |
| 2006/0153085 A1 * | 7/2006 | Willins et al. ............... | 370/242 |
| 2006/0200563 A1 * | 9/2006 | Hirose ......................... | 709/227 |

FOREIGN PATENT DOCUMENTS

JP    2004-128785 A    4/2004

* cited by examiner

*Primary Examiner*—Michael Won
(74) *Attorney, Agent, or Firm*—Canon U.S.A., Inc., IP Division

(57) ABSTRACT

A server that provides a plurality of types of content to another device selectively executes a control function or a function of being controlled in response to a type of a request from the other device, the request requesting the server to provide at least one of the plurality of types of content, and an operational status of the control function or the function of being controlled. The control function is a function of a controller that establishes and controls a wireless network. The function of being controlled is a function of a controlled component in a wireless network established and controlled by another controller.

7 Claims, 17 Drawing Sheets

ABSTRACT

SERVER THAT PROVIDES A PLURALITY OF TYPES OF CONTENT TO ANOTHER DEVICE AND METHOD FOR CONTROLLING THE SERVER

BACKGROUND OF THE INVENTION

1. Field of the Invention

The present invention relates to a server that provides a plurality of types of content to another device and a method for controlling the server.

2. Description of the Related Art

In wireless local area network (LAN) standards corresponding to the Institute of Electrical and Electronics Engineers (IEEE) 802.11, the infrastructure mode and the ad-hoc mode are provided. In the infrastructure mode, stations (STAs) communicate with each other under the control of an access point (AP). In the ad-hoc mode, STAs communicate with each other without control by an AP.

A technique for performing switching between the infrastructure mode and the ad-hoc mode is disclosed in United States Patent Application 20040063458 (Japanese Patent Laid-Open No. 2004-128785), in which communication is started in the infrastructure mode, and the communication mode is changed to the ad-hoc mode when STAs are in an environment in which the STAs can communicate with each other without the intervention of an AP.

However, a problem exists in that, when a repeater, such as an AP, relays communications between wireless terminals and a wired network, the communication mode cannot be readily switched between the infrastructure mode and the ad-hoc mode. For example, when, in addition to communications via an AP, communications with a terminal in a wired network are performed, the communication mode cannot be automatically changed to the ad-hoc mode.

Moreover, another problem exists in that transmission of communication data suitable for the nature of the communication data cannot be made merely by changing the communication mode from the infrastructure mode to the ad-hoc mode. These problems will now be described in detail.

In the IEEE 802.11e standard, a hybrid coordinator is defined. A hybrid coordinator sets an enhanced distributed channel access (EDCA) parameter set in response to the status of a transmission line and sends the EDCA parameter set to terminals in the form of a beacon and the like. An EDCA parameter set includes quality of service (QoS) information, such as the acknowledgement policy, and four parameters defined for individual access categories.

A first parameter is an arbitration interframe space number (AIFSN) that is the number of frames that are deferred for adjustment after detecting that no carrier exists before sending radio waves. A second parameter is CWmin, and a third parameter is CWmax (CW is an abbreviation for contention window that determines the window width for controlling contention). A fourth parameter is TXOP limit (the maximum time during which a transmission opportunity is continuously given).

SUMMARY OF THE INVENTION

The present invention provides a technique in which a server that provides a plurality of types of content to another device can perform communication efficiently. The present invention provides a server that provides a plurality of types of content to another device. The server includes a control device configured to function as a controller that establishes and controls a wireless network, a controlled device configured to function as a controlled component in a wireless network established and controlled by another controller, and a selection device configured to selectively execute an operation of the server as a controller via the control device or an operation of the server as a controlled component via the controlled device in response to a type of a request from the another device, wherein the request requests the server to provide at least one of the plurality of types of content, and an operational status of the control device or the controlled device.

Further features of the present invention will become apparent from the following description of exemplary embodiments with reference to the attached drawings.

DESCRIPTION OF THE EMBODIMENTS

Figure 1:
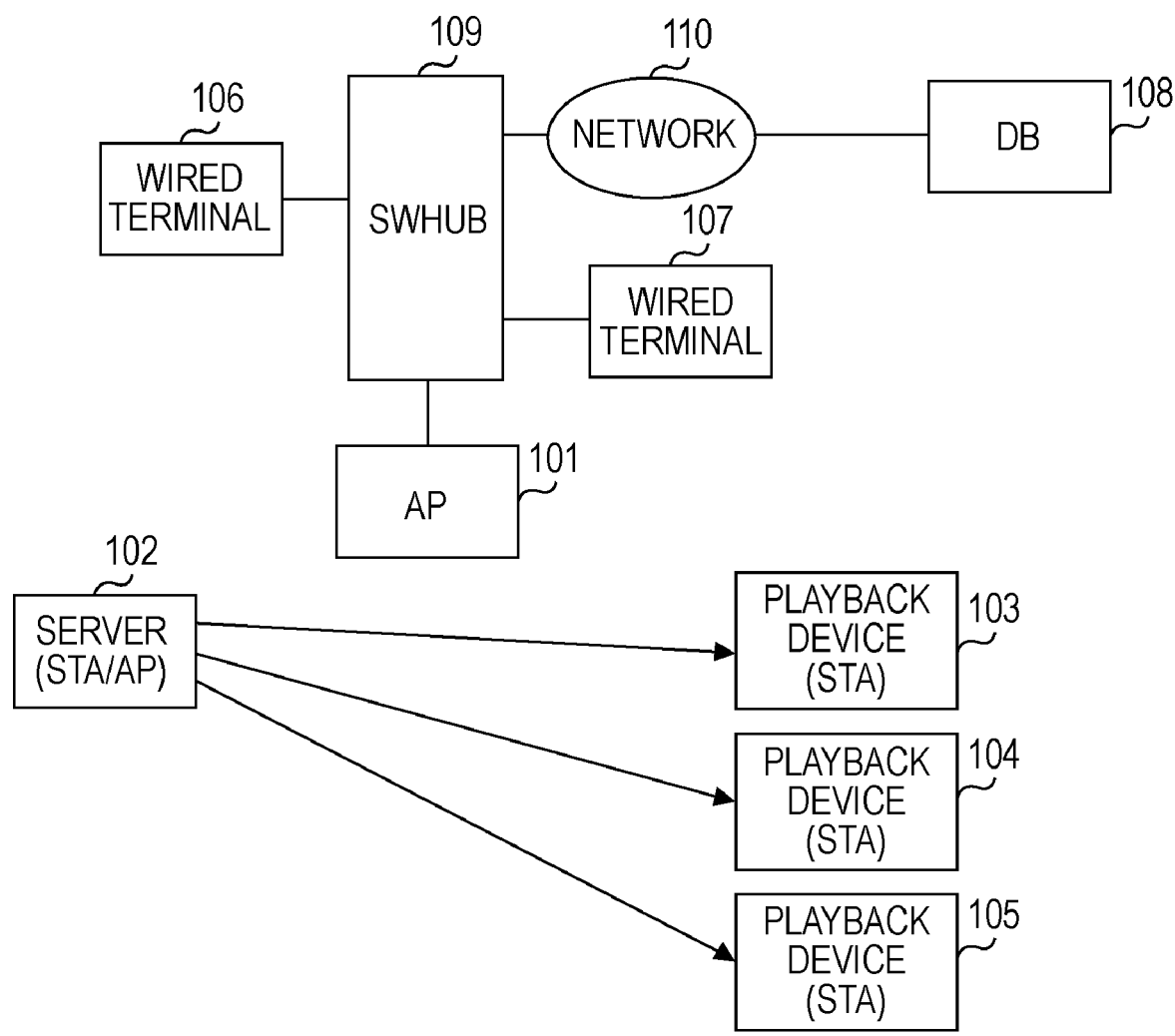
FIG. 1 is a block diagram of a system according to a first exemplary embodiment of the present invention.

The structure of a system according to a first exemplary embodiment will now be described with reference to FIG. 1. It is assumed that a wireless communication device described in the following exemplary embodiments includes a wireless LAN communication function according to the IEEE 802.11 standard and the IEEE 802.11e standard. Although the present invention can be applied to transmitting various types of content, transmission of music and video will be described as examples in the following description. The content also includes service information, for example compact disc (CD) information and information on video data, which is described below.

An access point (hereinafter called an AP) 101 functions as a repeater and establishes and controls a wireless network by an AP function. A server 102 is a media server for music data, video data, etc., and distributes music data, video data, etc. The server 102 further functions as an AP and a station (hereinafter called STA). Hereinafter, a mode in which a server functions as an AP is called an AP mode, and a mode in which a server functions as a STA is called a STA mode.

When the server 102 operates in the AP mode, the server 102 establishes and controls a wireless network other than the AP 101. When the server 102 operates in the STA mode, the server 102 participates in a wireless network established by an AP and performs wireless communication under the control of the AP. The server 102 does not include a wired network interface for connecting to a distribution system that includes a wired network.

Playback devices 103, 104, and 105 play back media, such as music data and video data, operate in the STA mode, and perform wireless communication as STAs. When the playback devices 103, 104, and 105 perform wireless communication in the STA mode, the playback devices 103, 104, and 105 participate in a wireless network established by an AP and perform wireless communication under the control of the AP.

Wired terminals 106 and 107 are connected to a network on the side of a wired network interface of the AP 101. A database (DB) 108 is a database for music CDs, is connected to the other network, and stores information, such as the titles of music CDs, artist names, tune names, and performance times of tunes. An Internet router 109 includes a switching hub (SWHUB). A network 110 is the network, for example, the Internet, other than the network controlled by the AP 101.

Figure 2:
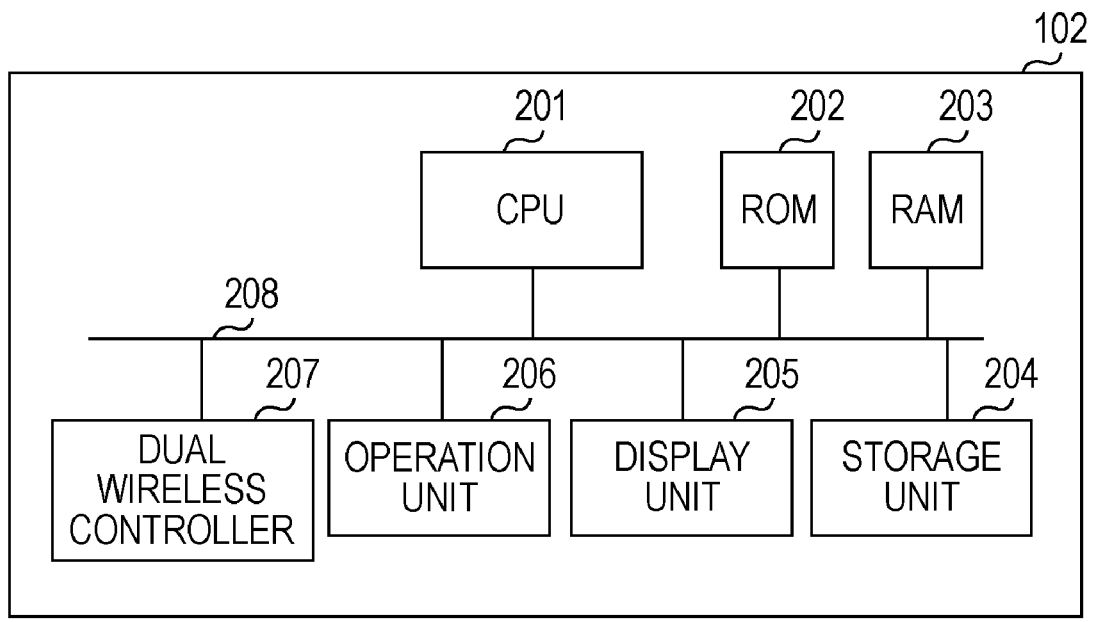
FIG. 2 is a block diagram of a server that includes an access point mode and a station mode.

FIG. 2 is a block diagram illustrating the structure of the server 102. A central processing unit (CPU) 201 is a control unit that performs overall control of the server 102 according to programs stored in a read only memory (ROM) 202 and a random access memory (RAM) 203. Various types of operation of the server 102, described below, are performed under the control of the CPU 201. The ROM 202 is a semiconductor memory that stores programs, parameters, etc., that need not be changed. The ROM 202 stores programs, parameters, etc., necessary for the CPU 201 to control various types of operation described below. The RAM 203 is a memory that temporarily stores programs, data, and the like provided from, for example, an external device.

A storage unit 204 stores, for example, application programs to be executed in the server 102. The storage unit 204 includes a hard disk drive (HDD) fixed in the server 102 and stores video data described below. Alternatively, the storage unit 204 may be a medium that can be detached from the server 102, for example, a floppy disk (FD), an optical disk such as a CD or a Digital Versatile Disc (DVD), a magnetic card, an optical card, an integrated circuit (IC) card, or a memory card.

A display unit 205 includes, for example, a liquid crystal display and displays data held in the server 102, supplied data, etc. An operation unit 206 includes a pointing device, a keyboard, etc., and inputs data (signals) corresponding to user operation into the device. A dual wireless controller 207 is a network controller based on the IEEE 802.11 standard suite. The dual wireless controller 207 can operate in both the AP mode and the STA mode. A system bus 208 connects the components described above so that the components can communicate with each other.

It is assumed that the server 102 includes only one CD drive and cannot provide a plurality of music playback services at the same time. Moreover, it is assumed that a plurality of pieces of video content can be played back at the same time because video data is stored in the storage unit 204.

Figure 3:
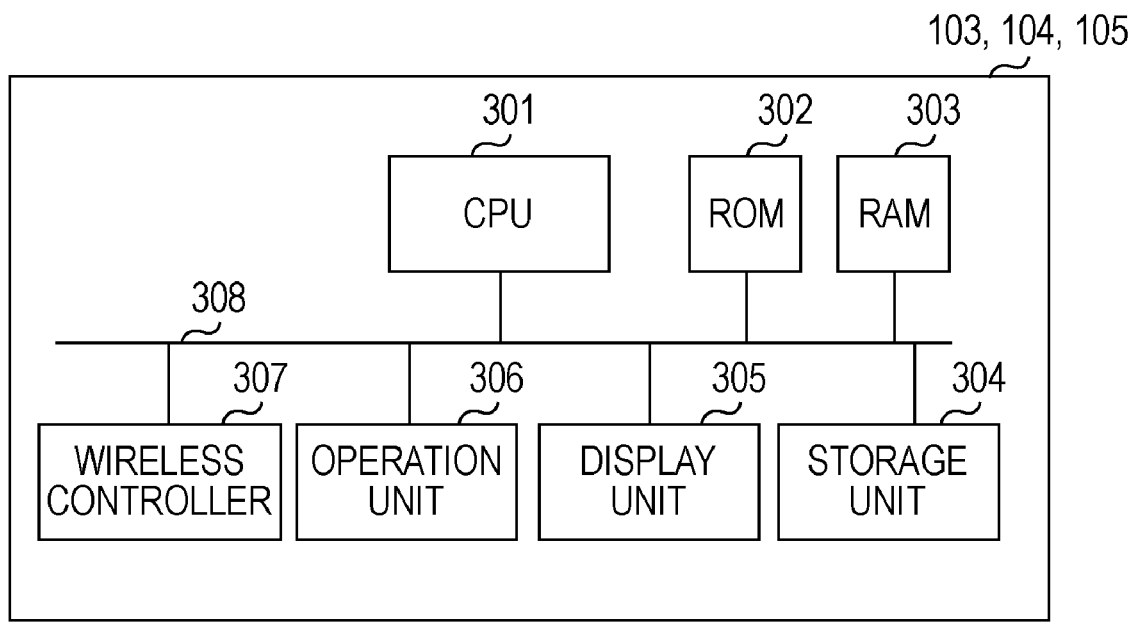
FIG. 3 is a block diagram of a playback device that includes only the station mode.

FIG. 3 is a block diagram illustrating the structure of each of the playback devices 103, 104, and 105. Each of the playback devices 103, 104, and 105 includes a CPU 301, a ROM 302, a RAM 303, a display unit 305, and an operation unit 306. These components are similar to the CPU 201, the ROM 202, the RAM 203, the display unit 205, and the operation unit 206 described above in FIG. 2.

A storage unit 304 stores, for example, application programs to be executed in each of the playback devices 103, 104, and 105 for playing back video and music. The storage unit 304 may be a medium that can be detached from each of the playback devices 103, 104, and 105, for example, an FD, an optical disk such as a CD or a DVD, a magnetic card, an optical card, an IC card, or a memory card. A wireless controller 307 is a network controller based on the IEEE 802.11 standard suite. The wireless controller 307 does not operate in the AP mode and operates in the STA mode.

Processes in the individual devices in the present embodiment will now be described.

Figure 4:
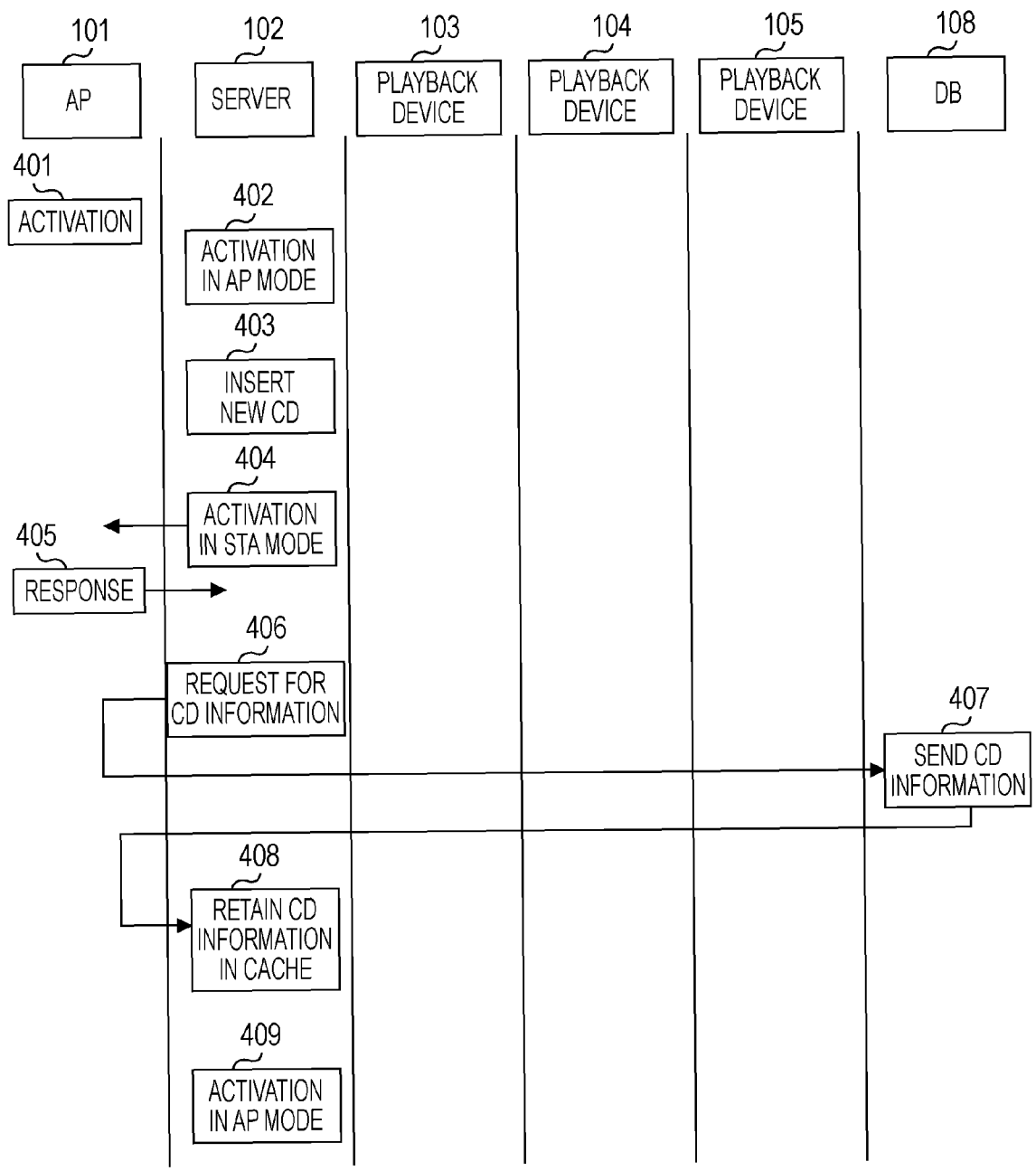
FIG. 4 is a sequence chart illustrating the process of activating a server in a first exemplary embodiment.

FIG. 4 is a sequence chart illustrating the process of activating the server 102. In step 401, the AP 101 is activated. When the AP 101 is activated as an AP, the AP 101 puts various types of information on the network, for example, a network identifier and frequency channels, in a beacon and sends the beacon at regular intervals.

Then, the server 102 searches for networks established by surrounding APs. Two methods exist for searching for networks established by surrounding APs: scanning all radio channels to detect whether beacons are sent; and broadcasting a search request (a probe request) in all radio channels. In the first method, various types of information on networks established by APs that send beacons can be obtained by analyzing the content of detected beacons. In the second method, various types of information on networks established by APs that send responses can be obtained by analyzing the responses from the APs in response to a search request. In the following description, it is assumed that networks are searched for in the server 102 and the playback devices 103, 104, and 105 in a manner similar to the first method.

The server 102 determines by the aforementioned search whether any surrounding AP establishes a network. In this case, the server 102 detects a beacon sent from the AP 101. The server 102 analyzes the content of the detected beacon and determines network information necessary to establish a network other than the network established by the AP 101. Then, in step 402, the server 102 is activated in the AP mode and establishes the network other than the network established by the AP 101. When the server 102 is activated in the AP mode, the server 102 puts various types of information on the network, for example, a network identifier and frequency channels, in a beacon and sends the beacon at regular intervals.

The AP mode is provided in the server 102 in case the server 102 establishes a separate network, a communication band can be used efficiently compared with a case where the server 102 performs communication in a wireless network controlled by another AP, in which a plurality of STAs exist. For example, when a network is formed only by the server 102 and devices that communicate with the server 102, communications can be performed unaffected by communications by devices that do not communicate with the server 102.

Another reason the AP mode is provided in the server 102 is that the aforementioned EDCA parameter set can be determined appropriately. In the IEEE 802.11e standard, parameters can be specified for the individual access categories: voice/video/best effort/background in an EDCA parameter set. The server 102 can play back a piece of CD music data and a plurality of pieces of video at the same time. It is better to change an EDCA parameter set appropriately in response to the number of communications of music data, video data, etc. An AP determines an EDCA parameter set. Thus, it is better for the server 102 to operate as an AP. However, when the server 102 provides services to the wired terminals 106 and 107, the server 102 connects to the AP 101 as a STA and provides distribution services of music and video data.

After the server 102 is activated in the AP mode, when a user of the system inserts a CD medium into a CD drive, in step 403, the server 102 detects the insertion of the CD medium. When the server 102 has been just activated, the server 102 does not hold the CD information of the CD medium, such as the title of the CD, the artist name, tune names, and performance times of tunes. Thus, the server 102 needs to access the DB 108 to obtain the CD information. However, since the server 102 operates in the AP mode and is in a network separate from the network established by the AP 101, the server 102 cannot communicate with terminals in the network 110. Thus, the server 102 needs to connect to the AP 101 as a STA to access the DB 108.

Accordingly, in step 404, the server 102 reboots the dual wireless controller 207 in the STA mode and sends an association request to the AP 101. In this case, the dual wireless controller 207 stops operating in the AP mode. Association means establishing connection between an AP and a STA in communications based on the IEEE 802.11 standard.

In step 405, the AP 101 accepts the association request and sends a response. In the following description, it is assumed that an AP unconditionally accepts an association request from a STA and establishes connection to the STA. In an alternative embodiment, the AP can employ any well-known authentication procedure for accepting the association request from a STA.

Then, in step 406, the server 102 performs wireless communication under the control of the AP 101 and requests the CD information from the DB 108 via the AP 101. In this case, it is assumed that the server 102 or the user of the server 102 holds information of the terminal name or address of the DB 108 in advance.

In the DB 108, CD information distribution service is always available. In step 407, the DB 108 returns the CD information as a response. In step 408, when the server 102 receives the CD information, the server 102 retains the CD information in a cache that includes the RAM 203 or the storage unit 204.

Since the server 102 has obtained necessary information, in step 409, the server 102 reboots the dual wireless controller 207 in the AP mode and re-establishes a network other than the network established by the AP 101. In this case, operation in the STA mode is stopped.

In this way, when the server 102 activated in the AP mode needs to perform communication through a wired network, the server 102 is automatically rebooted in the STA mode and connected to the AP 101. Then, after the server 102 obtains necessary information by communicating with the AP 101 through the wired network, the server 102 stops operating in the STA mode, is rebooted in the AP mode, and establishes a network other than the network established by the AP 101.

Figure 5:
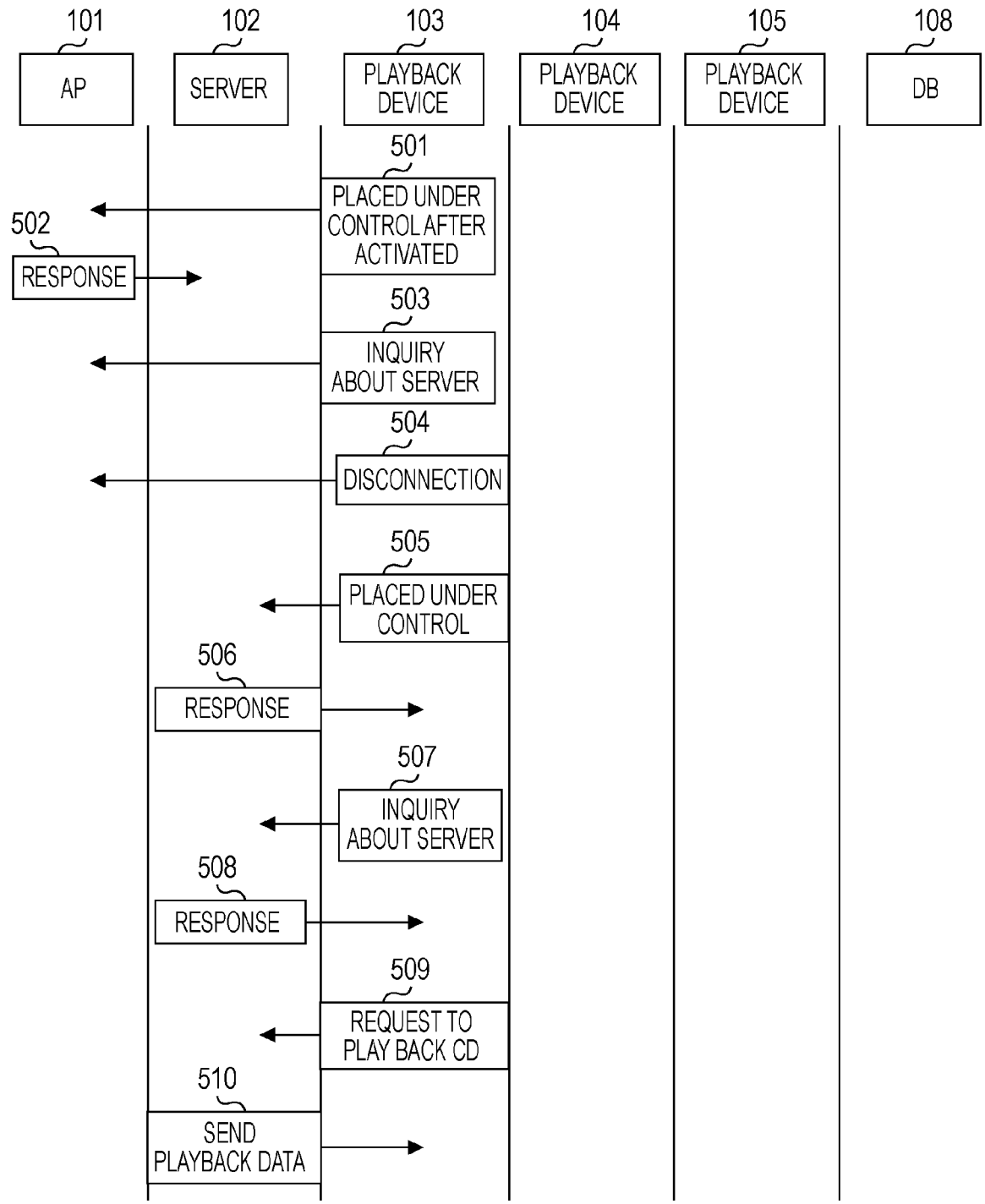
FIG. 5 is a sequence chart illustrating the process of a first playback device in the first exemplary embodiment.

The operation of the playback device 103, which is a renderer, will now be described with reference to FIG. 5. It is first determined what media server provides what service in a network to which the playback device 103 belongs. In this case, the Universal Plug and Play (UPnP) protocol is used to search for services. In the UPnP protocol, a message for service search is broadcasted. When the playback device 103 has received a request for service search from the user, the playback device 103 searches for a network established by an AP, participates in a network that is found, and searches for services provided in the network.

In this case, it is assumed that the playback device 103 first finds and participates in the network established by the AP 101. Specifically, in step 501, the playback device 103 sends an association request according to the IEEE 802.11 standard to the AP 101. In step 502, the AP 101 accepts the association request. When the playback device 103 has connected to the AP 101, in step 503, the playback device 103 broadcasts a message for searching for a media server.

At this time, since no media server exists in the network of the AP 101, no response to the message is provided. Thus, in step 504, when the playback device 103 does not receive a response within prescribed time, the playback device 103 disconnects association with the AP 101.

Then, the playback device 103 searches for a network established by another AP. In this case, since the server 102 has established a network, the playback device 103 finds the network established by the server 102. When the playback device 103 has found the network established by the server 102 operating in the AP mode, in step 505, the playback device 103 sends an association request to the server 102. In step 506, the server 102 operating in the AP mode accepts the association request. Then, in step 507, the playback device 103 broadcasts an inquiry message for searching for a media server.

The server 102 operates as an AP and a media server. Thus, in step 508, the server 102 sends a response to the service search as a media server upon receiving the inquiry message. Simultaneously, the server 102 sends information on video data stored in the storage unit 204. At this time, when any cached CD information exists, the server 102 also sends the cached CD information. In this case, since the server 102 has already cached CD information, as described with reference to FIG. 4, the server 102 sends the cached CD information as a part of service information.

The playback device 103 having received the response from the server 102 displays the received service information so that the user can select services. When the user of the playback device 103 desires to play back CD music and selects a title of CD music, in step 509, the playback device 103 sends the server 102 a request to play back the selected title. When the server 102 has received the playback request, in step 510, the server 102 starts to send playback data of the title specified in the playback request. Then, the playback device 103 receives and plays back the playback data.

Before the server 102 distributes the playback data, the server 102 determines whether a communication band for distributing the specified playback data can be reserved. When the communication band can be reserved, the server 102 sets an EDCA parameter set suitable for distribution of the playback data (music) specified by the playback device 103 and distributes the playback data after reserving the communication band specified in this parameter set. When the communication band cannot be reserved, the server 102 rejects the request to distribute the playback data from the playback device 103.

Figure 6:
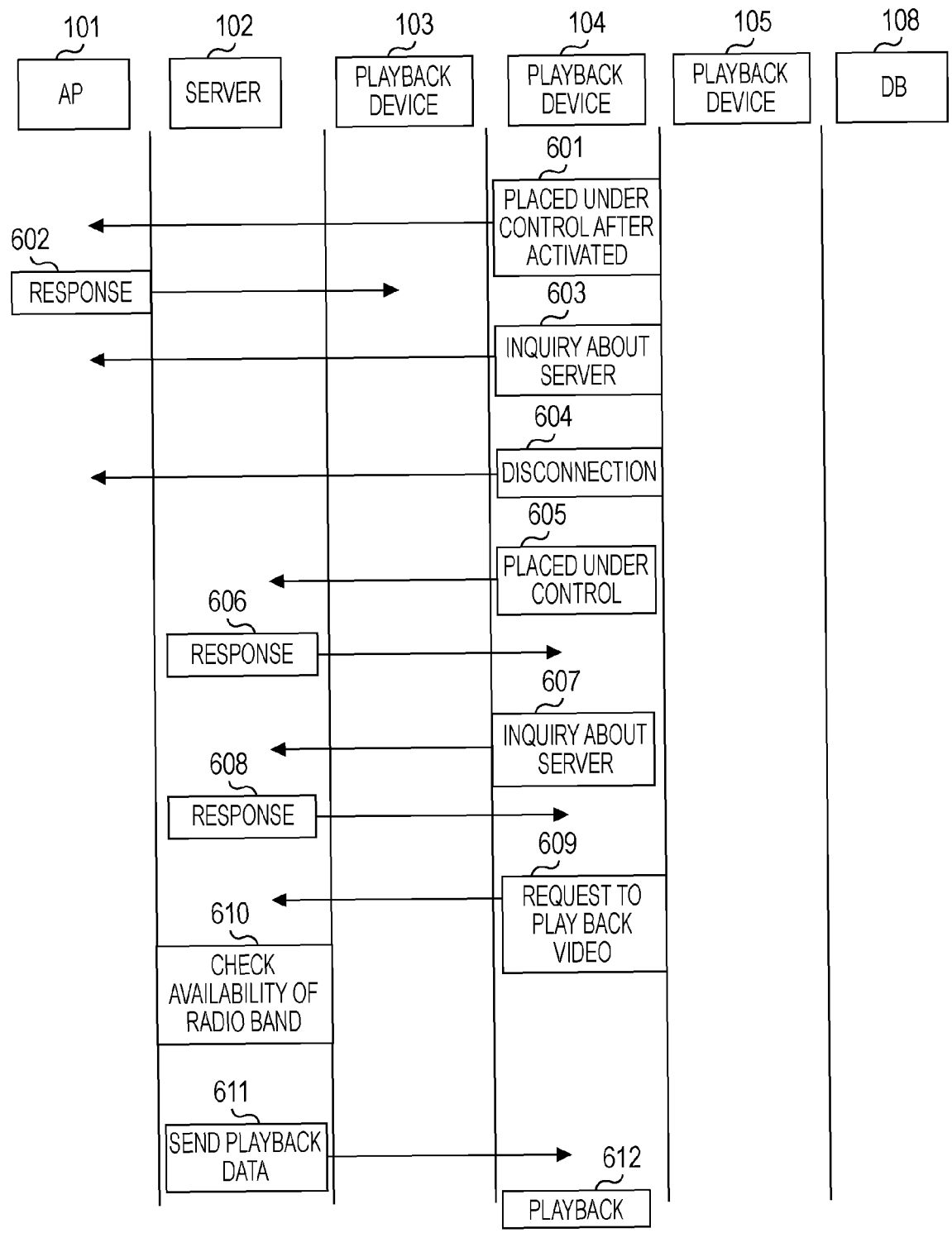
FIG. 6 is a sequence chart illustrating the process of playing back a medium in a second playback device in the first exemplary embodiment.

The process of playing back a medium in the playback device 104 will now be described with reference to FIG. 6. Steps 601 to 608 are the same as steps 501 to 508 in FIG. 5.

In step 609, the playback device 104 sends the server 102 a request to play back video data stored in the storage unit 204 in the server 102 in response to a request from a user. In step 610, the server 102 determines whether a radio band for sending the video in the storage unit 204 can be reserved upon receiving the request to play back the video data. When the server 102 determines that the radio band can be reserved, in step 611, the server 102 reserves the radio band and sends playback data of the video data in the storage unit 204 through the reserved radio band. Then, in step 612, the playback device 104 receives and plays back the playback data.

Figure 7:
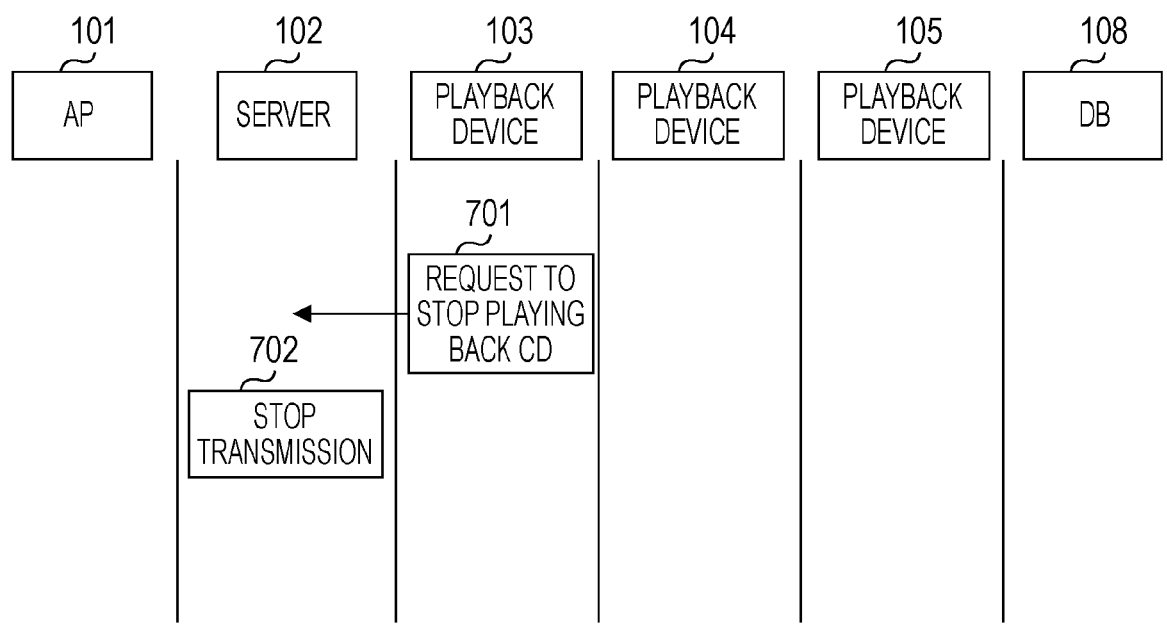
FIG. 7 is a sequence chart illustrating the process of a request to stop CD music in the first playback device in the first exemplary embodiment.

FIG. 7 is a sequence chart illustrating the process of a request to stop CD music played back in the playback device 103. When the user of the playback device 103 performs a stop operation of the CD music, in step 701, the playback device 103 sends the server 102 a request to stop playing back the CD music. Then, in step 702, the server 102 having received the request stops transmission of the playback data. Then, the server 102 releases the communication band reserved for music after stopping playback of the music.

Figure 8:
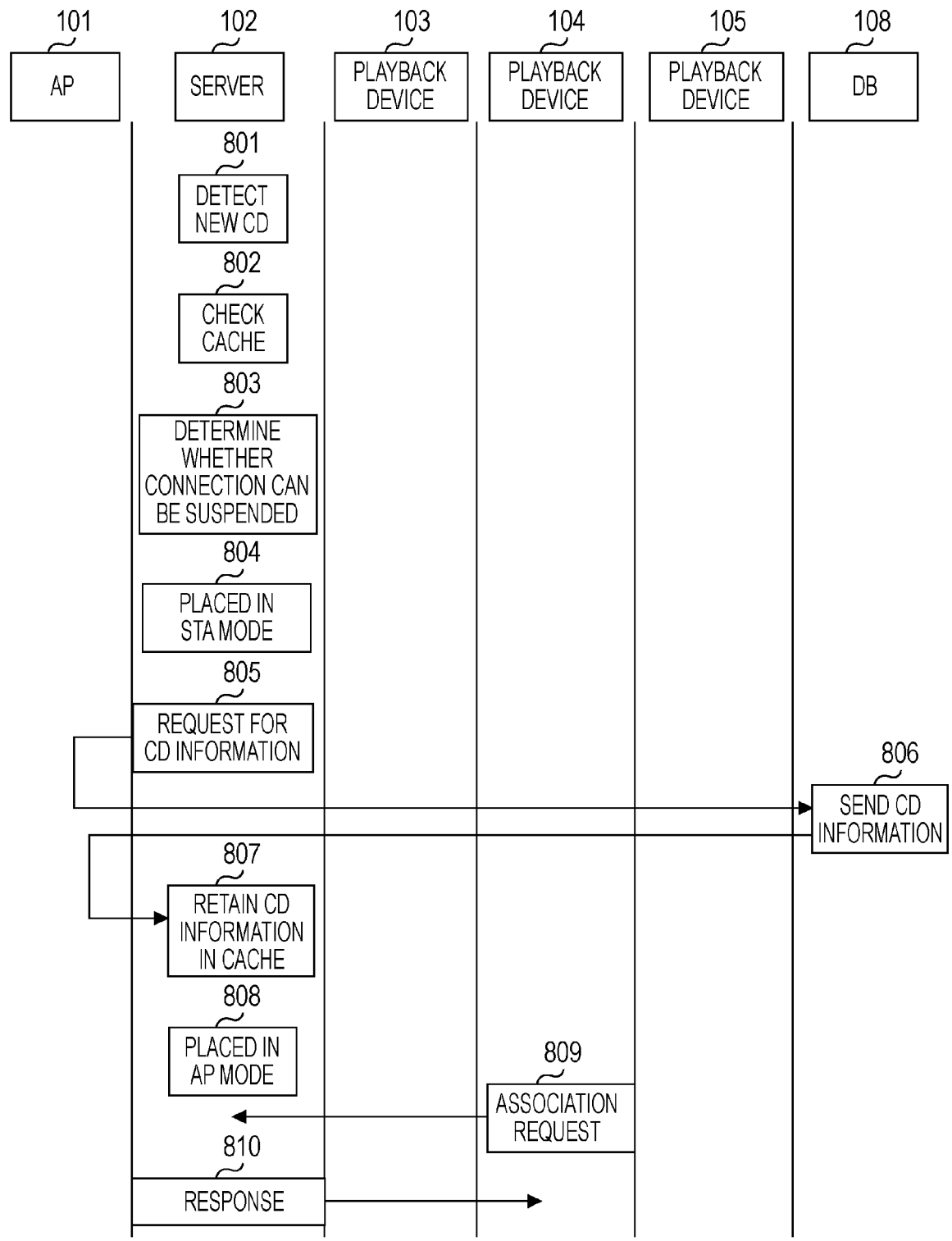
FIG. 8 is a sequence chart illustrating a process that is performed when another music CD is inserted into the server in the first exemplary embodiment.

FIG. 8 illustrates a process performed when another music CD is inserted into the server 102 in the status illustrated in FIG. 7. That is to say, in this status, only transmission of video data to the playback device 104 and playback of the video data are performed.

A user first inserts a new music CD into the CD drive. When the server 102 detects the insertion of the music CD in step 801, the server 102 determines in step 802 whether the CD information of the music CD, such as the title of the music CD, is retained in the cache.

When the CD information of the inserted music CD does not exist in the cache, the server 102 needs to obtain the CD information from the DB 108. In this case, the server 102 needs to connect to the AP 101. For this purpose, the operation mode of the dual wireless controller 207 needs to be changed from the AP mode to the STA mode to connect to the AP 101. However, when the operation mode is changed to the STA mode, connections to terminals associated with the server 102 are temporarily disconnected. Thus, in step 803, the server 102 determines whether connections to terminals associated with the server 102 can be suspended, i.e., temporarily disconnected.

Priorities assigned to a process of acquiring the information of CD music and a process of playback of video are used as the criteria for the determination. In this case, it is assumed that the priority assigned to a process of acquiring the information of CD music is high, and the priority assigned to a process of playback of video is low. Thus, the server 102 determines to suspend playback of video.

Moreover, in this case, it is assumed that the aforementioned priorities can be set in advance by a system administrator, a user of the server 102, etc., and the priority assigned to a process of playback of video may be set so that the priority assigned to the process of playback of video is higher than the priority assigned to a process of acquiring the information of CD music. Moreover, priorities may be assigned to other processes, for example, playback of CD music.

When the server 102 determines to suspend playback of video, the server 102 sends the playback device 104 a notification that playback of video has been suspended. Then, in step 804, the server 102 changes the operation mode of the dual wireless controller 207 to the STA mode and establishes an association with the AP 101. When the server 102 has connected to the AP 101, the server 102 requests the CD information from the DB 108 via the AP 101 in step 805.

When the DB 108 has received the request for the CD information from the server 102, the DB 108 sends the CD information to the server 102 in step 806. Then, in step 807, the server 102 receives the CD information from the DB 108 and retains the CD information in the cache. Since the server 102 has obtained necessary information, in step 808, the server 102 reboots the dual wireless controller 207 in the AP mode and re-establishes a network other than the network established by the AP 101.

After connection between the playback device 104 and the server 102 is disconnected, the playback device 104 periodically searches for a network established by the server 102. When the playback device 104 has found a network re-established by the server 102, the playback device 104 resends an association request to the server 102 in step 809. In step 810, the server 102 accepts the association request, reconnects to the playback device 104, and resumes suspended transmission of video. When playback of video is resumed, a communication band is reserved again.

Communication can be performed with transmission parameters suitable for the nature of data effectively using a communication band by appropriately changing the operation mode of the server 102 between the AP mode and the STA mode, as described above. In the present embodiment, the control of the server 102 depends on the following two events: the presence of information in the cache; and the presence of another service that is being provided and the priorities in a case where another service is being provided.

Operations in the server 102 will now be described with reference to FIGS. 9 to 13. In flowcharts referred to in the following description, a combination of statuses, together with a status number, is illustrated in an oval symbol that indicates the status. A first status indicates, for example, one of the following statuses of the operation mode of the dual wireless controller 207: no operation (none), the STA mode (STA), the AP mode (AP), and the ad hoc mode (ad-hoc). A second status indicates one of the following statuses of a CD medium: a status (CD_idle) in which a medium is not being played back and a status (CD_playback) in which a medium is being played back.

A third status indicates one of the following statuses of the storage unit (HDD) 204, as in a CD medium: HDD_idle and HDD_playback. For example, in step 900 in FIG. 9, the server 102 is initialized, and the combination of statuses is none/CD_idle/HDD_idle. This combination of statuses indicates that the dual wireless controller 207 is not activated, no CD medium is loaded in the CD drive, and transmission for playing back video data in the storage unit 204 is not being performed. In this combination of statuses, when a default initialization process is performed, the dual wireless controller 207 is activated in the AP mode in step 901. The process proceeds to step 1000 where the combination of statuses is AP/CD_idle/HDD_idle.

Figure 9:
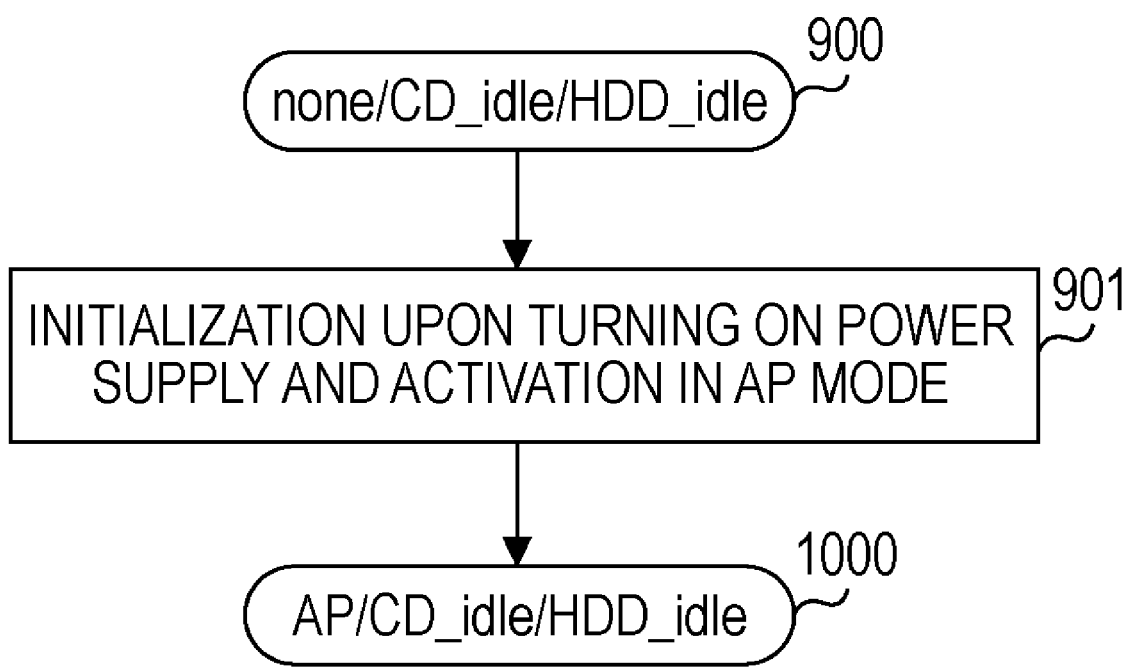
FIG. 9 is a flowchart illustrating the operation of the server in the first exemplary embodiment.
Figure 10:
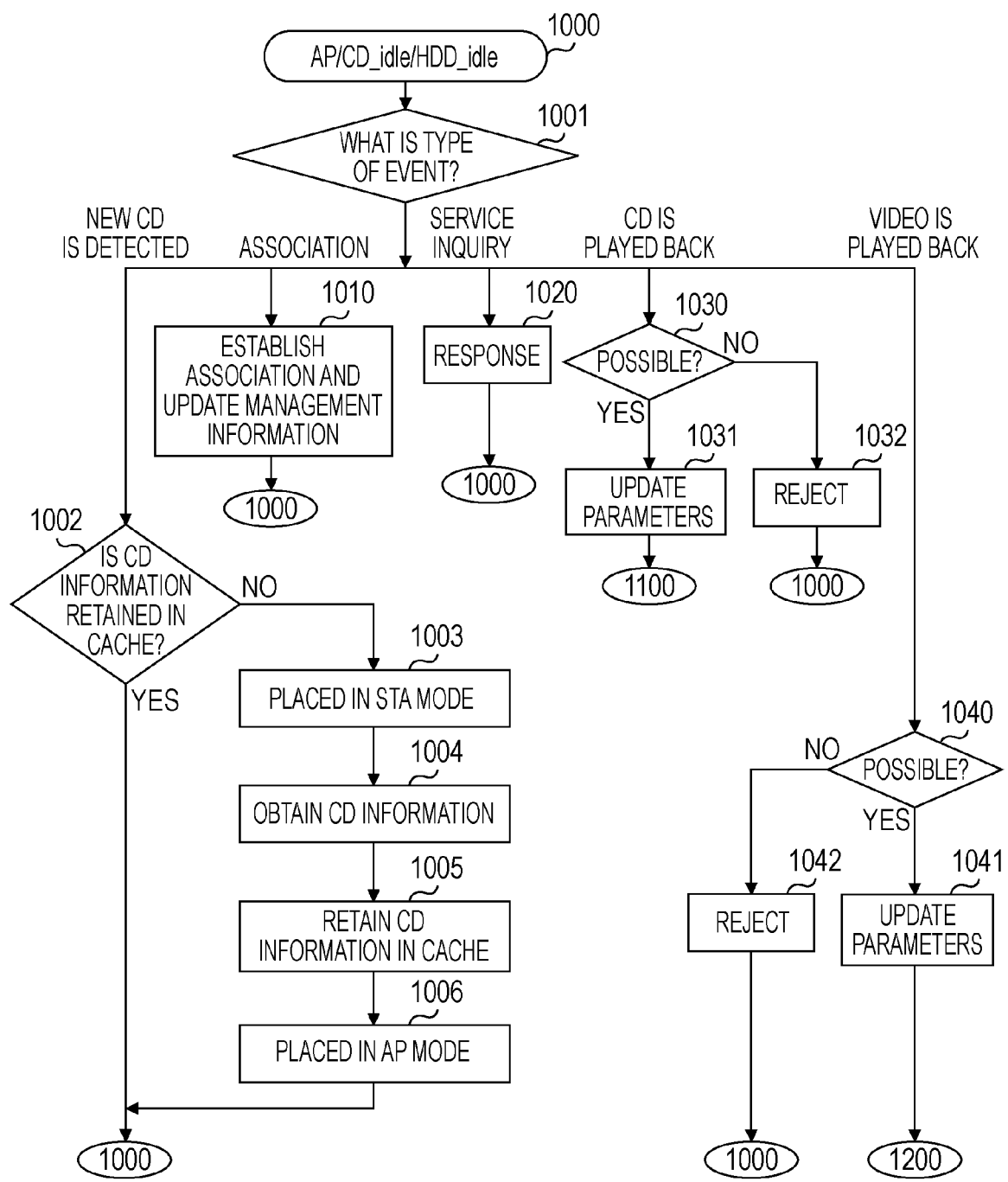
FIG. 10 is a flowchart illustrating the operation of the server in the first exemplary embodiment.

FIG. 10 is a flowchart illustrating a process starting from step 1000 in FIG. 9. In step 1001, the server 102 determines the type of an event that has occurred and performs a process corresponding to the event that has occurred. When a new music CD has been inserted into the CD drive and detected, the server 102 determines in step 1002 whether the CD information of the CD is retained in the cache. When the CD information is retained in the cache, the process goes back to step 1000.

When the CD information is not retained in the cache, the process proceeds to steps in which the CD information is obtained from the DB 108. Specifically, in step 1003, the server 102 is temporarily put in the STA mode and connects to the AP 101 by establishing an association with the AP 101. In step 1004, the server 102 obtains the CD information from the DB 108 via the AP 101. In step 1005, the server 102 stores the obtained CD information in the cache. When the server 102 holds the CD information, in step 1006, the server 102 is again put in the AP mode and establishes a network.

When the server 102 has received an association request from a playback device, in step 1010, the server 102 accepts the association request and updates management information, such as the number of terminals associated with the server 102. Then, the process goes back to step 1000.

When the server 102 has received a service inquiry from a playback device, in step 1020, the server 102 sends back information on services that can be provided by the server 102 as a response. Specifically, the server 102 sends back index information, such as titles of music, video, etc., in response to an inquiry about distribution services of CD music data, video data, etc., from, for example, the playback device 103. Then, the process goes back to step 1000.

When the server 102 has received a request to play back CD music from, for example, the playback device 103, in step 1030, the server 102 determines whether the requested process of playing back music can be performed. When the requested process of playing back music can be performed, in step 1031, the server 102 sets an EDCA parameter set according to the IEEE 802.11e standard to reserve a communication band necessary to play back music.

Specifically, AIFSN, CWmin, CWmax, and TXOP limit in the EDCA parameter set are changed so as to send data of CD music that is played back in a radio band with the top priority. For example, when CD music data is sent in the access category of voice, the values of parameters for the individual access categories of voice, video, best effort, and background are set so that the priority set by parameters for the access category of voice is higher than the priorities set by parameters for the access categories of video, best effort, and background.

In general, the priority is increased by decreasing the values of AIFSN, CWmax, and CWmin and decreasing the difference between the values of CWmax and CWmin. Moreover, the higher the value of TXOP limit, the larger the number of frames that can be sent every time a transmission right is given. EDCA parameter sets include an EDCA parameter set for an AP and an EDCA parameter set to be sent as an information element of a beacon for a terminal. In step 1031, the server 102 sets an EDCA parameter set for an AP, or both an EDCA parameter set for an AP and an EDCA parameter set to be sent as an information element of a beacon for a terminal.

Figure 11:
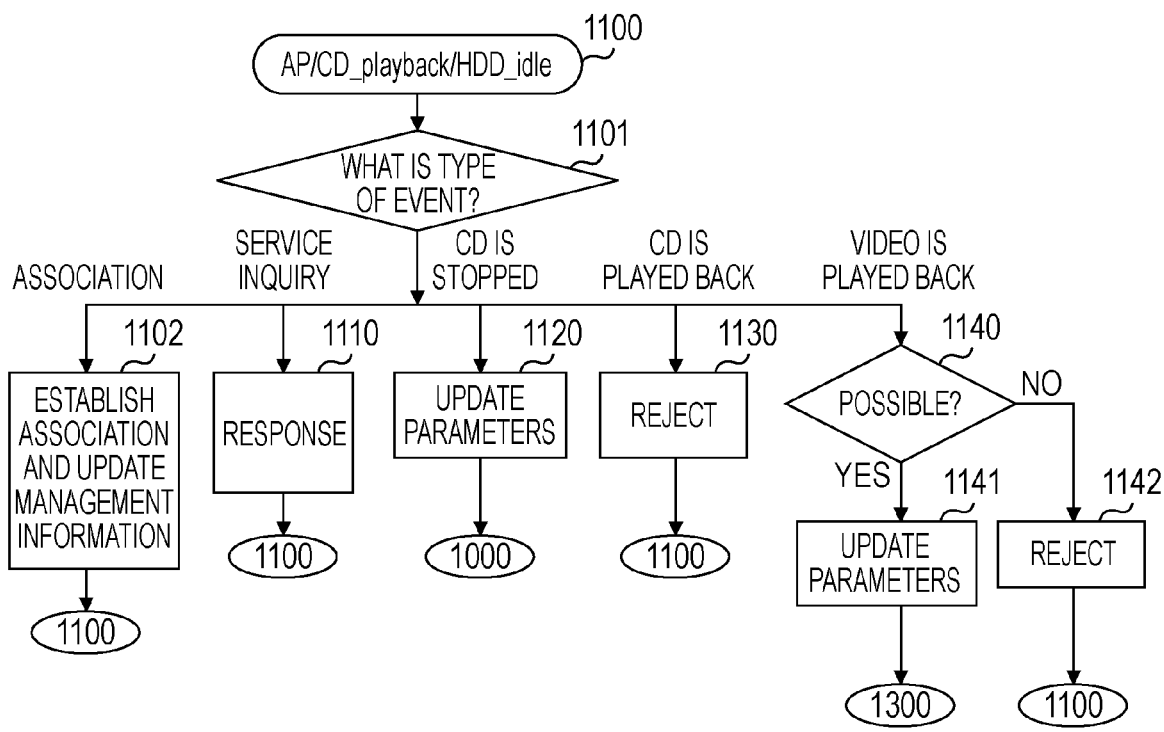
FIG. 11 is a flowchart illustrating the operation of the server in the first exemplary embodiment.

After the server 102 sets the EDCA parameter set, the process proceeds to step 1100 (FIG. 11). When the server 102 determines in step 1030 that CD music cannot be played back, the server 102 rejects the request to play back CD music in step 1032. Specifically, the server 102 returns a rejection response to the terminal having sent the request to play back music. Then, the process goes back to step 1000.

Figure 12:
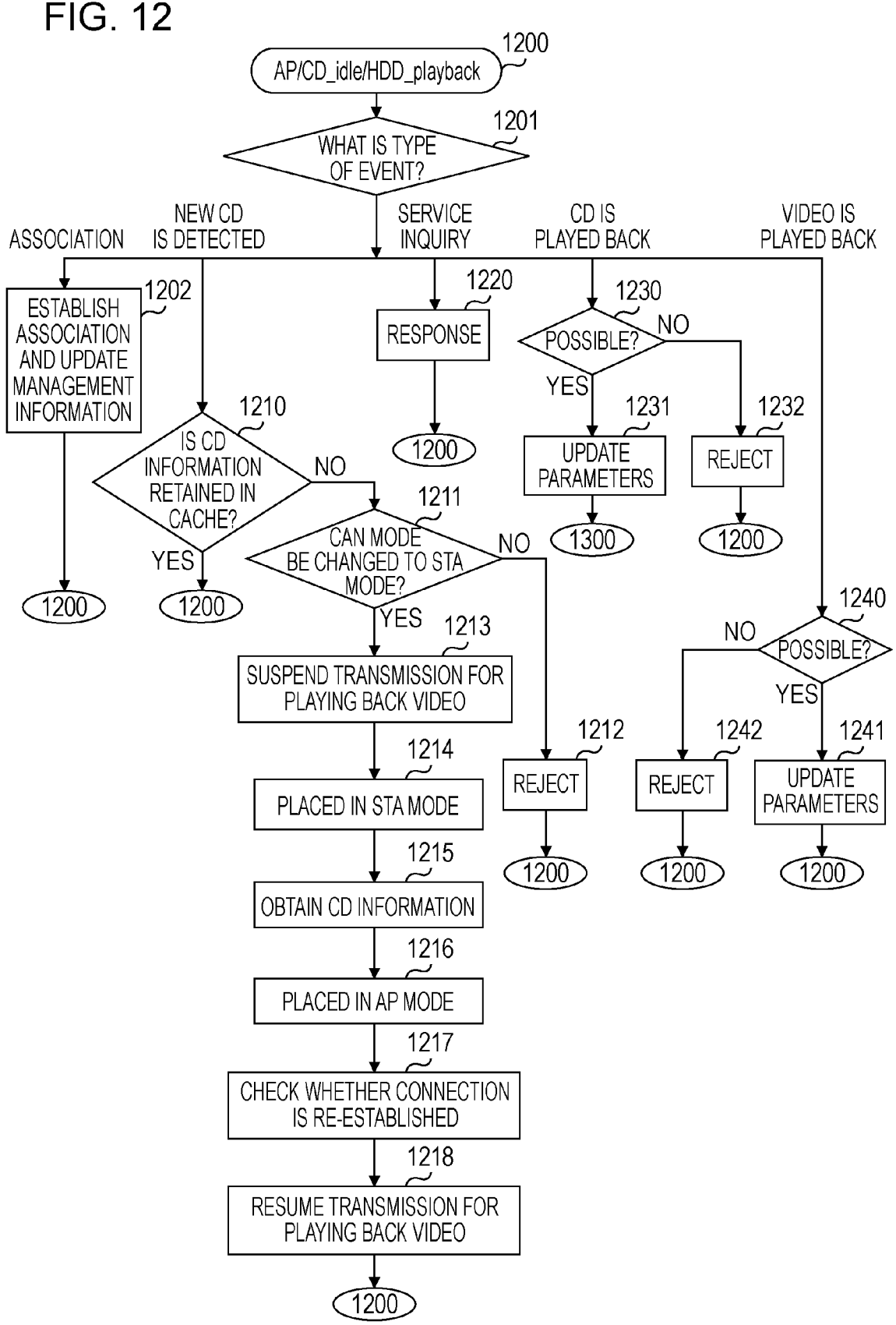
FIG. 12 is a flowchart illustrating the operation of the server in the first exemplary embodiment.

When the server 102 has received a request to play back video from, for example, the playback device 104, in step 1040, the server 102 determines whether the requested process of playing back video can be performed. When the requested process of playing back video can be performed, in step 1041, the server 102 sets an EDCA parameter set according to the IEEE 802.11e standard so as to reserve a communication band necessary to play back video. Then, the process proceeds to step 1200 (FIG. 12). When the server 102 determines in step 1040 that video cannot be played back, the server 102 rejects the request to play back video in step 1042 by returning a rejection response to the terminal having sent the request. Then, the process goes back to step 1000.

FIG. 11 is a flowchart illustrating processes in the server 102 in a case where various types of request are sent in step 1100 in FIG. 10, where the server 102 is sending playback data of CD music to a playback device, for example, the playback device 103.

In step 1101, the server 102 determines the type of an event that has occurred and performs a process corresponding to the event that has occurred.

When the server 102 has received an association request from a playback device, in step 1102, the server 102 accepts the association request and updates management information, such as the number of terminals associated with the server 102. Then, the process goes back to step 1100.

When the server 102 has received a service inquiry from a playback device, in step 1110, the server 102 sends back information on services that can be provided by the server 102 as a response. Then, the process goes back to step 1100.

When the server 102 has received a request to stop playing backing a music CD from a terminal playing backing the music CD, in step 1120, the server 102 stops distribution of music and resets the EDCA parameter set. Then, the process proceeds to step 1000.

When the server 102 has received a request to playback CD music, in step 1130, the server 102 returns a rejection response to the request because the server 102 is already playing music and cannot play back a plurality of music CDs at the same time. Then, the process goes back to step 1100.

Figure 13:
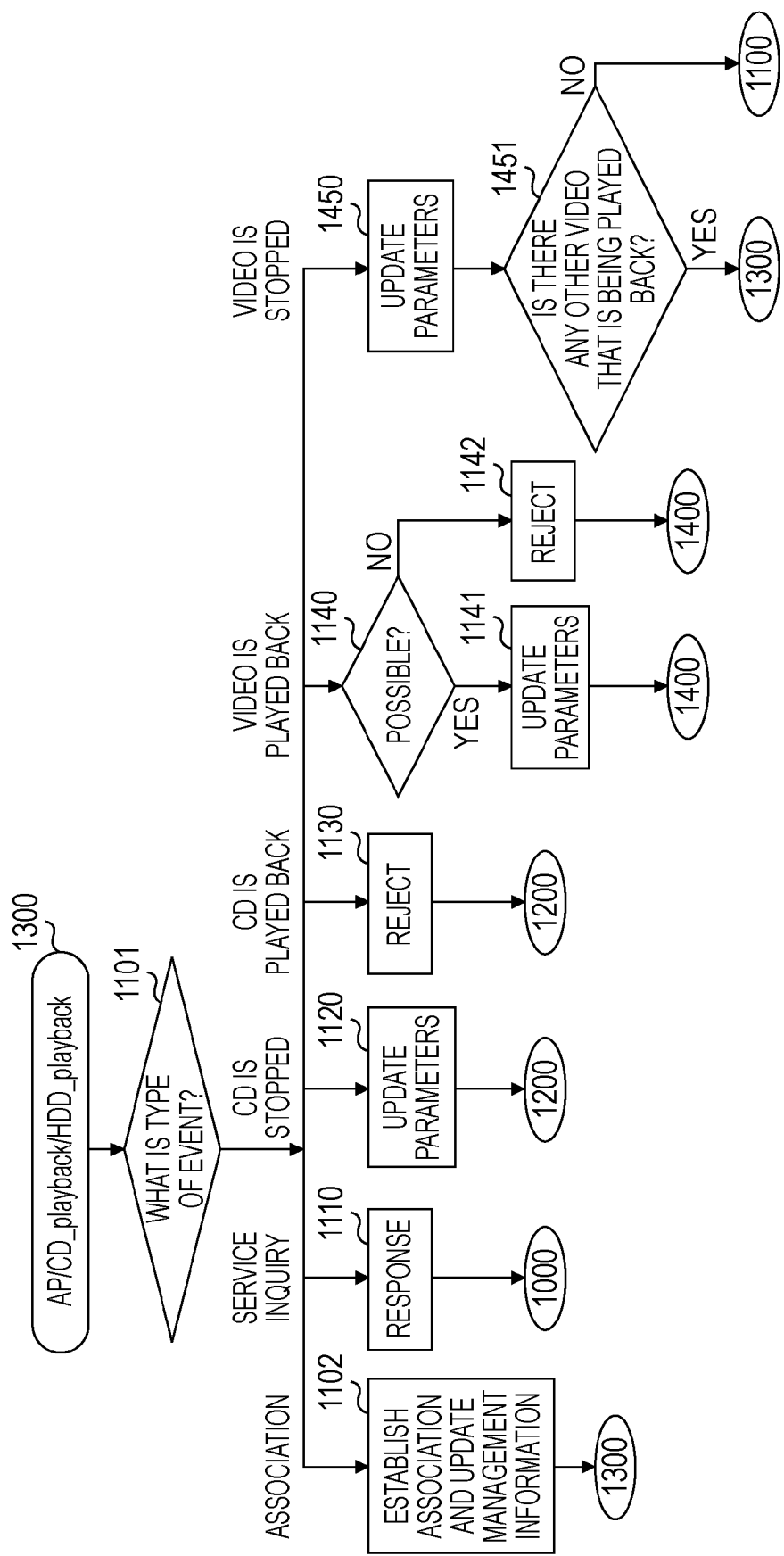
FIG. 13 is a flowchart illustrating the operation of the server in the first exemplary embodiment.

When the server 102 has received a request to play back video, in step 1140, the server 102 determines whether a communication band for sending the playback data of the requested video can be reserved. When the server 102 determines that a communication band for sending the playback data of the requested video can be reserved, in step 1141, the server 102 determines and sets an EDCA parameter set suitable for distribution of the playback data of the requested video. Then, the process proceeds to step 1300 (FIG. 13). When the server 102 determines that a communication band suitable for transmission of video cannot be reserved, in step 1142, the server 102 rejects the request by returning a rejection response to the request. Then, the process goes back to step 1100.

FIG. 12 is a flowchart illustrating processes in the server 102 in a case where various types of request are detected in step 1200 in FIG. 10, where the server 102 is performing transmission for playing back video. In step 1201, the server 102 determines the type of an event that has occurred and performs a process corresponding to the event that has occurred.

When the server 102 has received an association request from a playback device, in step 1202, the server 102 accepts the association request and updates management information, such as the number of terminals associated with the server 102. Then, the process goes back to step 1200.

When a new music CD has been inserted into the CD drive and detected, the server 102 determines in step 1210 whether the CD information of the CD is retained in the cache. When the CD information is retained in the cache, the process goes back to step 1200. When the CD information is not retained in the cache, the process proceeds to step 1211 where the server 102 determines whether to change the operation mode to the STA mode.

Priorities assigned to a process of acquiring the information of CD music and a process of playback of video are used as the criteria for the determination, as described above. In this case, it is assumed that the priority assigned to a process of acquiring the information of CD music is high, and the priority assigned to a process of playback of video is low. Moreover, it is assumed that the aforementioned priorities can be set in advance by a system administrator, a user of the server 102, etc., and the priority assigned to a process of playback of video may be set so that the priority assigned to the process of playback of video is higher than the priority assigned to a process of acquiring the information of CD music. Moreover, priorities may be assigned to other processes, for example, playback of CD music.

When the server 102 determines to change the operation mode to the STA mode, the process proceeds to step 1213 where the server 102 suspends transmission for playing back video. Then, in step 1214, the server 102 changes the operation mode of the dual wireless controller 207 to the STA mode and connects to the AP 101 by establishing an association with the AP 101. When the server 102 has connected to the AP 101, in step 1215, the server 102 requests the CD information from the DB 108 via the AP 101 and obtains the CD information from the DB 108. When the server 102 has obtained the CD information, the process proceeds to step 1216 where the server 102 changes the operation mode from the STA mode to the AP mode and establishes a network other than the network established by the AP 101.

A terminal that has temporarily disconnected connection to the server 102 periodically searches for a network established by the server 102 after connection to the server 102 is disconnected. When the terminal has found a network re-established by the server 102, the terminal resends an association request to the server 102 and connects to the server 102.

When the server 102 has confirmed in step 1217 that the terminal previously associated with the server 102 has re-established an association with the server 102, the process proceeds to step 1218 where the server 102 resumes the suspended transmission for playing back video. Then, the process goes back to step 1200.

When the server 102 determines in step 1211 that the operation mode cannot be changed to the STA mode, the process proceeds to step 1212 where the server 102 returns a rejection response to the request to play back the music CD. Then, the process goes back to step 1200.

When the server 102 has received a service inquiry from a playback device, in step 1220, the server 102 sends back information on services that can be provided by the server 102 as a response. Then, the process goes back to step 1200.

When the server 102 has received a request to play back CD music from a playback device, in step 1230, the server 102 determines whether the requested process of playing back music can be performed. When the requested process of playing back music can be performed, in step 1231, the server 102 sets an EDCA parameter set according to the IEEE 802.11e standard to reserve a communication band necessary to play back music. Specifically, AIFSN, CWmin, CWmax, and TXOP limit in the EDCA parameter set are changed to send data of CD music that is played back in a radio band with the top priority.

For example, when CD music data is sent in the access category of voice, the values of parameters for the individual access categories of voice, video, best effort, and background are set so that the priority set by parameters for the access category of voice is higher than the priorities set by parameters for the access categories of video, best effort, and background. In general, the priority is increased by decreasing the values of AIFSN, CWmax, and CWmin and decreasing the difference between the values of CWmax and CWmin.

Moreover, the higher the value of TXOP limit, the larger the number of frames that can be sent every time a transmission right is given. EDCA parameter sets include an EDCA parameter set for an AP and an EDCA parameter set to be sent as an information element of a beacon for a terminal. In step 1231, the server 102 sets an EDCA parameter set for an AP, or both an EDCA parameter set for an AP and an EDCA parameter set to be sent as an information element of a beacon for a terminal.

After the server 102 sets the EDCA parameter set, the process proceeds to step 1300. When the server 102 determines in step 1230 that CD music cannot be played back, the server 102 rejects the request to play back CD music in step 1232. Specifically, the server 102 returns a rejection response to the terminal having sent the request to play back music. Then, the process goes back to step 1200.

When the server 102 has received a request to play back video from a playback device, in step 1240, the server 102 determines whether the requested process of playing back video can be performed. When the requested process of playing back video can be performed, in step 1241, the server 102 sets an EDCA parameter set according to the IEEE 802.11e standard to reserve a communication band necessary to play back video. Then, the process goes back to step 1200.

When the server 102 determines in step 1240 that video cannot be played back, the server 102 rejects the request to play back video in step 1242 by returning a rejection response to the terminal having sent the request. Then, the process goes back to step 1200.

FIG. 13 is a flowchart illustrating processes in the server 102 in a case where various types of request are detected in step 1300 in FIG. 12, where the server 102 is performing both transmission for playing back a music CD and transmission for playing back video. Since events to be detected by the server 102 and corresponding processes, except an event in which video is stopped, in this status are the same as those in FIG. 11, the description is omitted herein.

When the server 102 has received a request to stop distribution of video from a transmission destination to which the video is sent, the server 102 accepts the request and stops distribution of the video. Then, in step 1450, the server 102 updates the EDCA parameter set. Then, in step 1451, the server 102 determines whether any other transmission is being performed for playing back video. When other transmission is being performed for playing back video, the process goes back to step 1300. When any other transmission is not being performed for playing back video, the process proceeds to step 1100 in FIG. 11.

Figure 14:
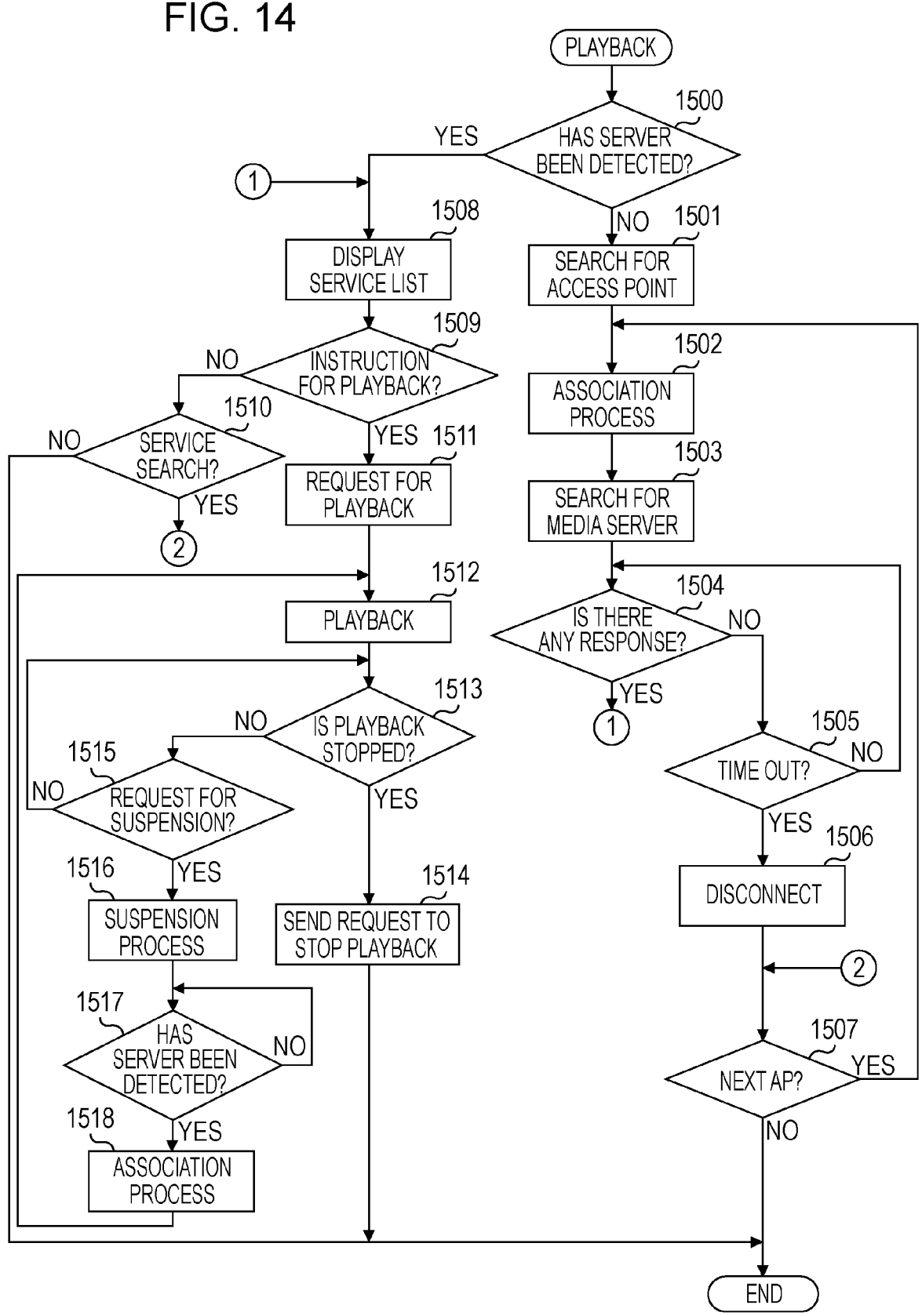
FIG. 14 is a flowchart illustrating the operations of the first and second playback devices and a third playback device in the first exemplary embodiment.

The operations of the playback devices 103, 104, and 105 will now be described with reference to FIG. 14. Although the operation of the playback device 103 will be described as an exemplary case, the playback devices 104 and 105 operate in a similar manner.

It is first determined what media server provides what service in a network to which the playback device 103 belongs. When the playback device 103 has received a request for service search from the user, in step 1500, it is determined whether any media server has been detected. When media server is detected, the process proceeds to step 1508 where the playback device 103 displays a list of services provided by the media server. When no media server has been detected, the process proceeds to step 1501 where the playback device 103 searches for APs. The method for searching for APs is described above.

After the playback device 103 finishes searching for APs, the process proceeds to step 1502 where the playback device 103 connects to each of the APs by executing an association procedure. Then, in step 1503, the playback device 103 broadcasts an inquiry message through the connected APs so as to search for media servers. Then, in step 1504, the playback device 103 starts a timer to wait for a response. In a case where the playback device 103 has not received a response even when the timer has expired (steps 1504 and 1505), the process proceeds to step 1506, where the playback device 103 disconnects connections to the connected APs.

Then, in step 1507, the playback device 103 determines whether or not there is next AP, which has not connected. When such an AP exists, the process returns to step 1502 where the playback device 103 connects to the AP by executing an association procedure. Then, the process proceeds to step 1503. When such an AP does not exist, the playback device 103 notifies the user that no service is available and completes the process.

In the above description, the process proceeds to step 1502 after the playback device 103 finishes searching for APs in step 1501. Alternatively, the process may proceed to step 1502 every time an AP is found. In this case, in step 1507, the playback device 103 searches for an AP again and determines whether or not there is next AP, which has not connected.

When the playback device 103 has received a response from a media server in step 1504 before the timer expires, the process proceeds to step 1508, where a list of services provided by the media server having returned the response is displayed. When the user sends an instruction to play back music or video upon viewing the list (step 1509), in step 1511, the playback device 103 sends the media server a request to play back music or video selected by the user. Then, when the server has started to send playback data, in step 1512, the playback device 103 plays back the playback data and detects the user's operation, communications from an AP, etc.

When the playback device 103 has detected the user's operation of stopping the playback (step 1513), in step 1514, the playback device 103 sends a request to stop the playback to the server sending the playback data to stop the playback and completes the process.

When the playback device 103 has not detected the user's operation of stopping the playback (step 1513), and the playback device 103 has received a request to suspend the playback from the server sending the playback data (step 1515), the process proceeds to step 1516, where the playback device 103 displays a message stating that the playback has been suspended and suspends the playback. Then, the playback device 103 periodically searches for the server having sent the request to suspend the playback.

When the playback device 103 has detected the server (step 1517), the process proceeds to step 1518 where the playback device 103 connects to the server (AP) by executing an association procedure. When the playback device 103 has connected to the server, in step 1512, the playback device 103 receives the suspended playback data and plays back the data.

In a case where the user does not send an instruction for playback in step 1509, when the playback device 103 has detected the user's operation of searching for another service (step 1510), the process proceeds to step 1507. When the playback device 103 has not detected the user's operation of searching for another service and when the user has sent an instruction to complete the process, the playback device 103 completes the process. Some media renderer applications in the playback devices 103, 104, and 105 may only send a request to play back a CD loaded in a server and may not send a request for CD information, such as a title. In this case, the server 102 needs to send a request for CD information to the DB 108 only when a user has sent a request for CD information. Thus, when the server 102 has received a request to obtain CD information from a playback device, the server 102 sends a request for CD information to the DB 108.

In another embodiment of the present invention, the server 102 may not be activated in the AP mode and may be activated in the STA mode. Processes in the present embodiment will now be described with reference to FIGS. 15 to 17. Since components in individual devices are similar to those in the previous embodiment, the description of the components is omitted herein.

Figure 15:
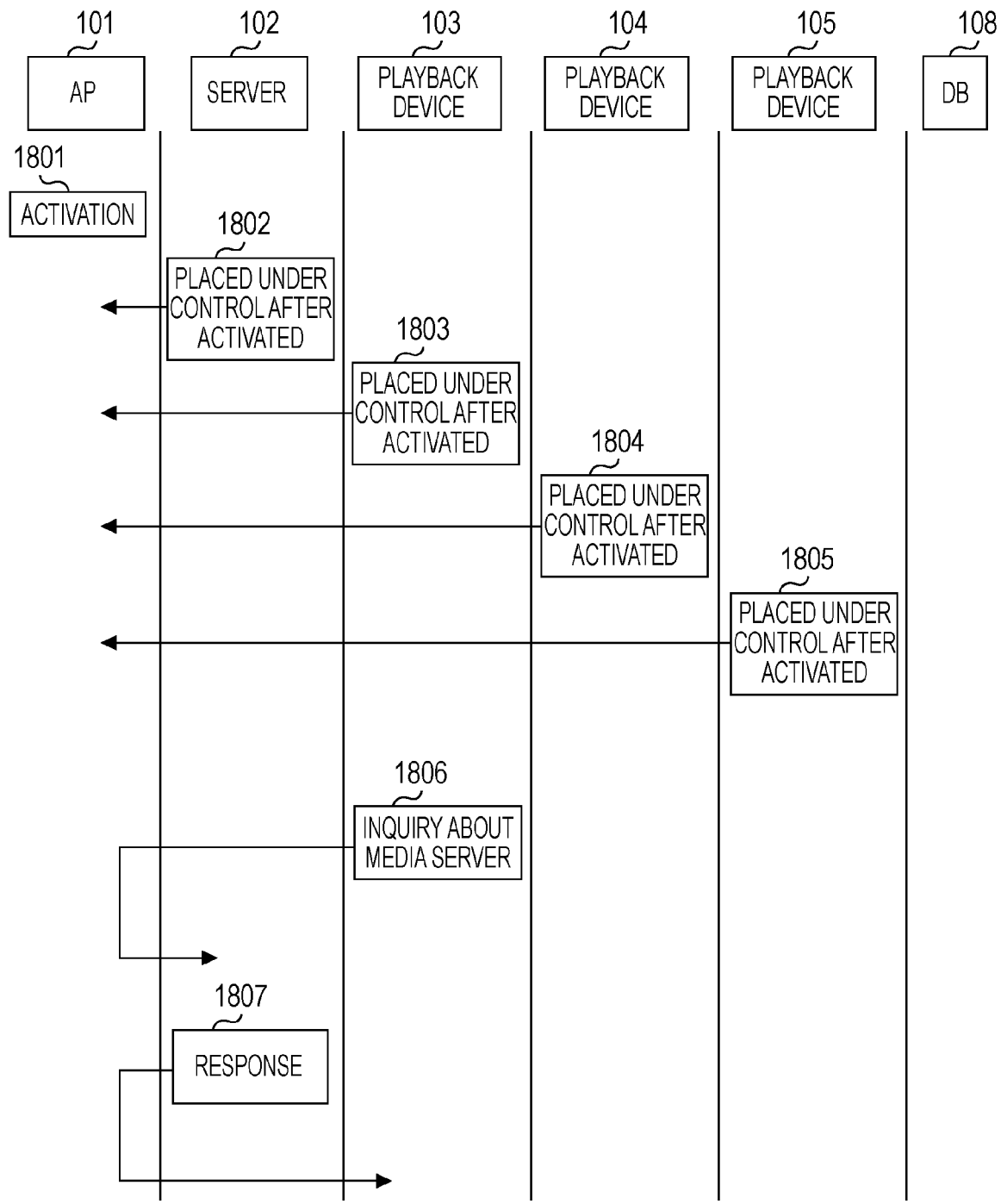
FIG. 15 is a sequence chart illustrating the process of a system in a second exemplary embodiment.

Turning to FIG. 15, in step 1801, the AP 101 is activated. After the server 102 and the playback devices 103, 104, and 105 are activated in the STA mode, in steps 1802 to 1805, the server 102 and the playback devices 103, 104, and 105 search for the AP 101 and connect to the AP 101 by executing an association procedure.

Then, a user of the playback device 103 activates a CD playback application. When this application has been activated, in step 1806, the playback device 103 broadcasts a message for searching for media servers in networks. Then, in step 1807, the server 102 receives the search message and returns a response to the playback device 103.

Figure 16:
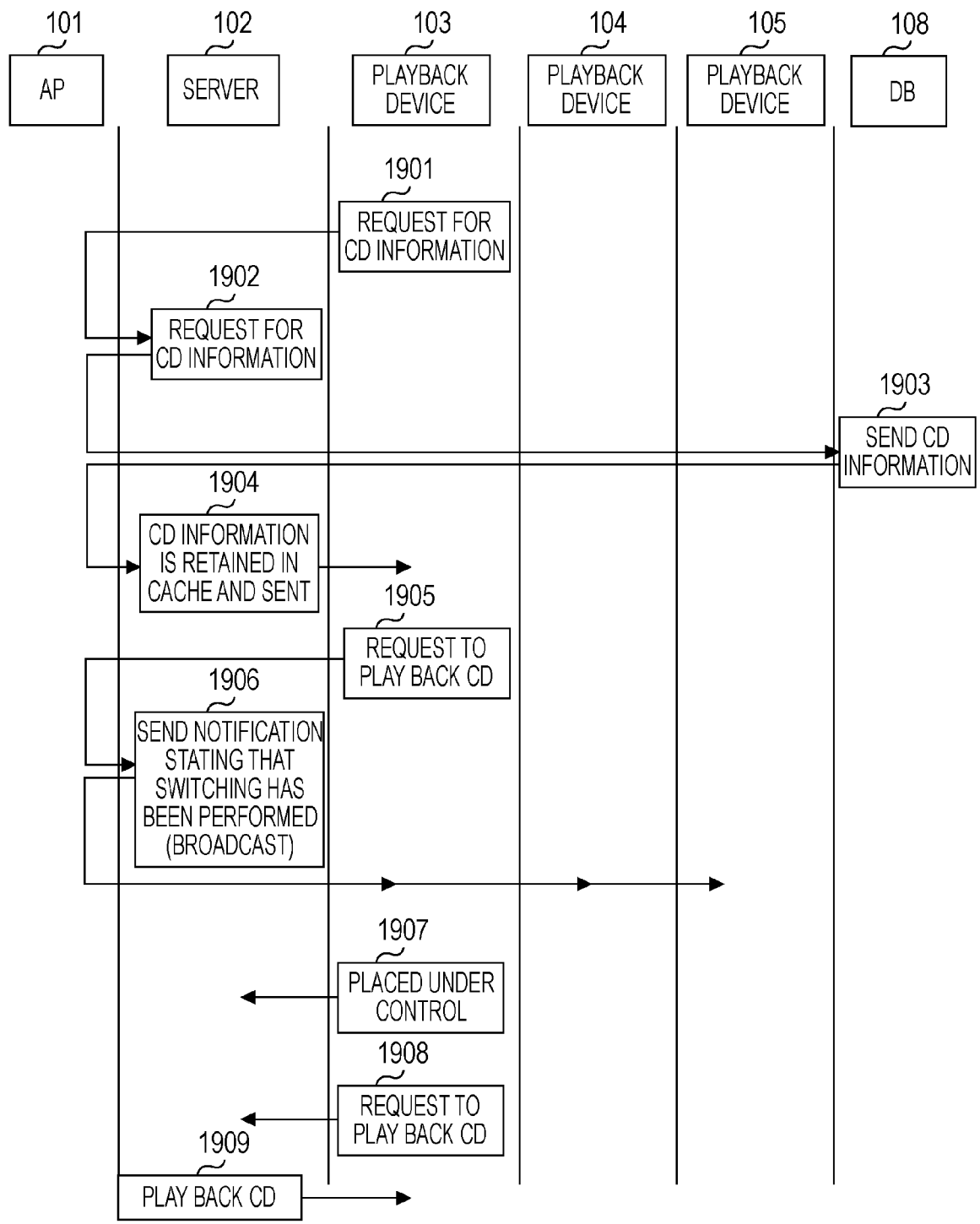
FIG. 16 is a sequence chart illustrating the process of the system in the second exemplary embodiment.

Then, in step 1901 in FIG. 16, the playback device 103 having received the response from the server 102 requests CD information that can be provided by the server 102. When the server 102 has received the request for CD information, the server 102 determines whether the CD information of a CD inserted in the CD drive is retained in the cache. When the CD information is retained in the cache, the server 102 sends the CD information to the playback device 103.

When the CD information is not retained in the cache, in step 1902, the server 102 requests the CD information from the DB 108 via the AP 101. Then, in step 1903, the DB 108 receives the request and sends the CD information to the server 102. Then, in step 1904, the server 102 receives the CD information from the DB 108, stores the CD information in the cache, and sends the CD information to the playback device 103.

At this point, when the user of the playback device 103 has performed a playback operation of a music CD and when the playback device 103 has detected the playback operation, in step 1905, the playback device 103 sends a request to play back a music CD to the server 102.

When the server 102 has received the request for playback, the server 102 transitions to the AP mode. In this transition process, in step 1906, the server 102 broadcasts a notification that the server 102 leaves the network of the AP 101, changes the operation mode to the AP mode, and establishes another network. The broadcasted notification reaches the playback devices 103, 104, and 105 via the AP 101 wirelessly. This notification may include information on the network established by the server 102 having transitioned to the AP mode, for example, a network identifier and frequency channels. The broadcasted notification further reaches the terminals 106 and 107 via a wired connection.

Since the playback device 103 has received the notification that the server 102 leaves the network of the AP 101, in step 1907, the playback device 103 also leaves the network of the AP 101 and participates in the network established by the server 102 in the AP mode by establishing an association with the server 102. Then, in step 1908, the playback device 103 resends a request to play back a music CD.

The server 102 having received the request determines whether the playback data of the music CD can be sent. This determination is made by determining whether a communication band can be reserved and whether music is already being played back. Even in a case where a communication band can be reserved, when music is already being played back, since the server 102 cannot perform concurrent playbacks of music, the server 102 determines that the playback of the music CD cannot be performed.

When music is not being played back, the server 102 determines that the playback of the music CD can be performed. In this case, since a communication band can be reserved and music is not being played back, the server 102 determines that the playback of the music CD can be performed, so that the server 102 sets an EDCA parameter set with which a communication band for playing back music is reserved. Then, in step 1909, the server 102 sends the playback data of the music CD to the playback device 103 through the reserved communication band.

Figure 17:
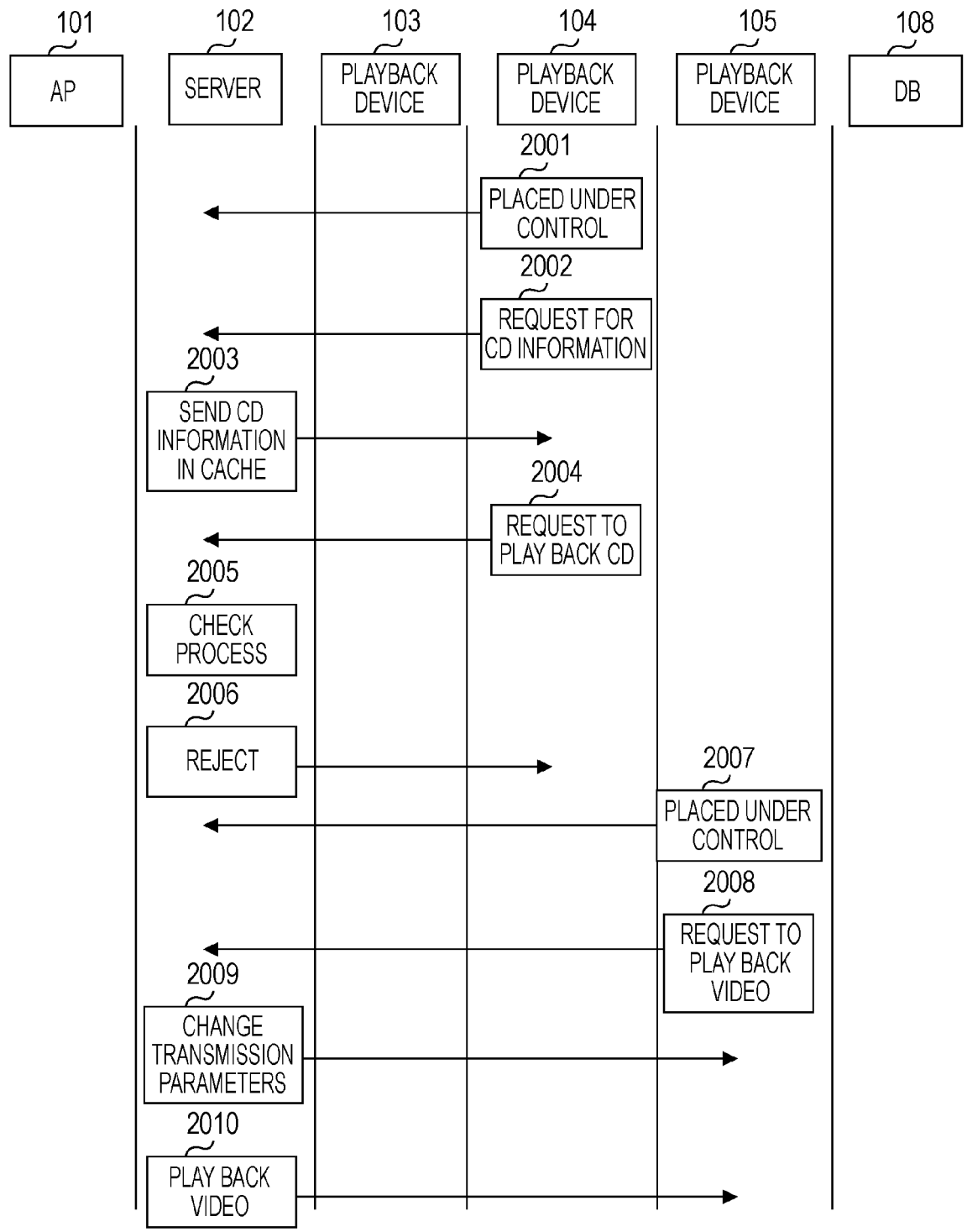
FIG. 17 is a sequence chart illustrating the process of the system in the second exemplary embodiment.

When the playback device 104 has detected a request to play back CD music from a user of the playback device 104, in step 2001 in FIG. 17, the playback device 104 leaves the network of the AP 101 and participates in the network of the server 102 by establishing an association with the server 102. Then, in step 2002, the playback device 104 requests the CD information from the server 102.

In step 2003, the server 102 having received the request confirms that the requested CD information is retained in the cache and sends the CD information to the playback device 104. Then, the playback device 104 displays the received CD information. When the playback device 104 has detected a user instruction for playback, in step 2004, the playback device 104 sends the server 102 a request to play back a music CD. In step 2005, the server 102 checks whether the server 102 can play back the requested music CD. However, since the server 102 cannot play back a plurality of pieces of music at the same time, in step 2006, the server 102 returns a rejection response to the playback request from the playback device 104.

At this point, it is assumed that a playback operation of video stored in the storage unit 204 has been performed in the playback device 105. When the playback device 105 has detected the playback operation, in step 2007, the playback device 105 leaves the network of the AP 101 and participates in the network of the server 102. Then, in step 2008, the playback device 105 sends the server 102 a request to play back video.

In step 2009, the server 102 having received the request calculates transmission parameters suitable for transmission of the playback data of the music CD and the playback data of the video and sets the calculated parameters as the EDCA parameter set to reserve a communication band. Then, in step 2010, the server 102 sends the playback data of the video through the reserved communication band.

Figure 18:
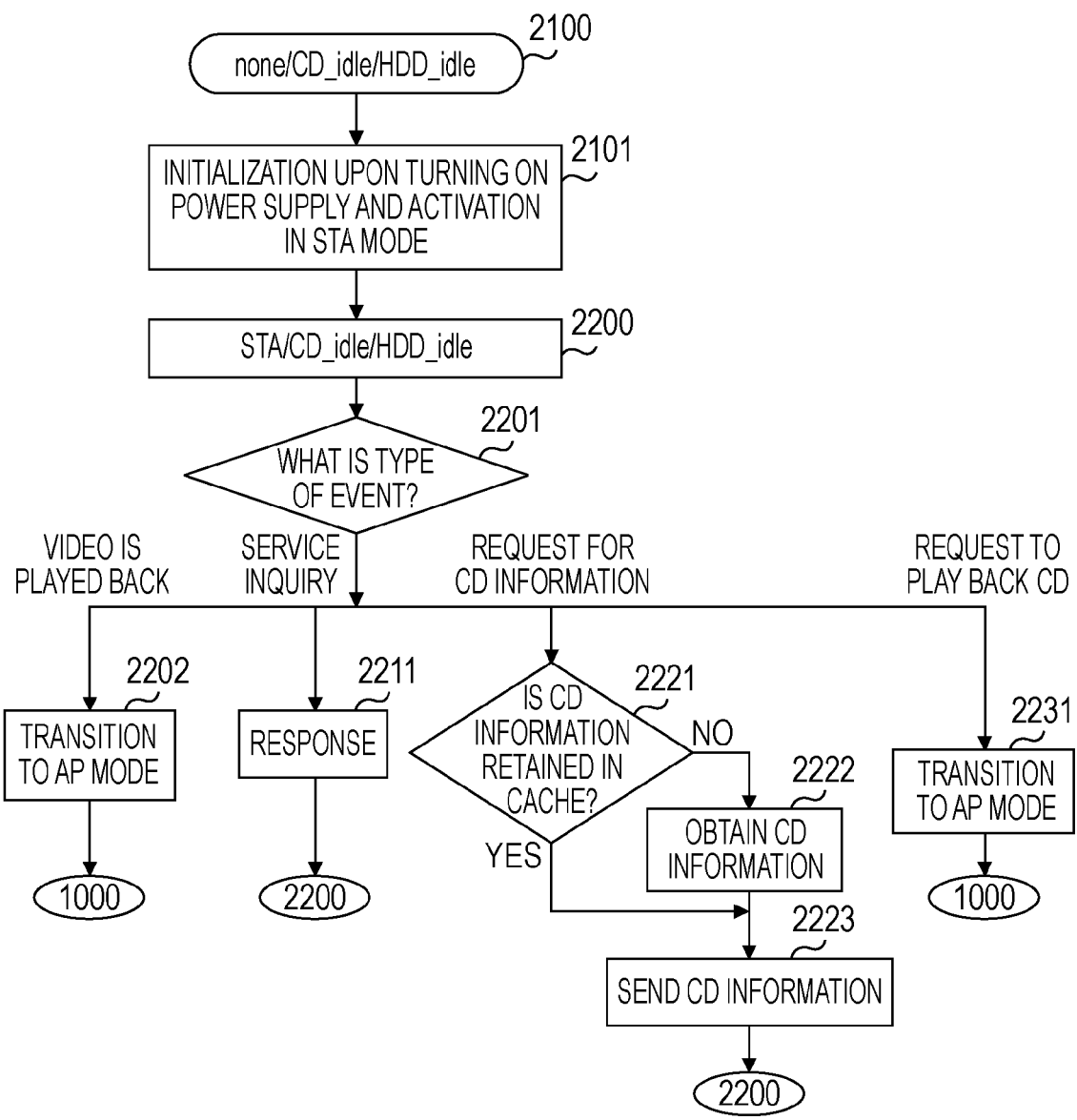
FIG. 18 is a flowchart illustrating the operation of the server in the second exemplary embodiment.

Operations in the server 102 according to the present embodiment will now be described with reference to FIG. 18. In step 2101, the server 102 is first activated in the STA mode at the time of initialization. Then, the server 102 searches for an AP and connects to an AP that is found by establishing an association with the AP. In this case, the server 102 connects to the AP 101. Then, the process proceeds to step 2200 where the combination of statuses is STA/CD_idle/HDD_idle.

In step 2200, the server 102 operates in the STA mode. In this status, in step 2201, the server 102 determines the type of an event that has occurred and performs a process corresponding to the event that has occurred.

When the server 102 has received an inquiry about media server services from a playback device via the AP 101, in step 2211, the server 102 sends back information on services that can be provided by the server 102 as a response. The process then returns to step 2200.

When the server 102 has received a request for CD information from a playback device, in step 2221, the server 102 determines whether CD information is retained in the cache. When no CD information is retained in the cache, the process proceeds to step 2222 where the server 102 requests CD information from the DB 108, obtains CD information, and stores the CD information in the cache. Then, in step 2223, the server 102 sends the requesting playback device the CD information obtained from the DB 108. Then, the process goes back to step 2200.

When the server 102 has received a request to play back a music CD, in step 2231, the server 102 transitions to the AP mode, as described above, and establishes a network in the AP mode. Then, the process proceeds to step 1000 in FIG. 10.

When the server 102 has received a request to play back video from a playback device, in step 2202, the server 102 transitions to the AP mode, as described above, and establishes a network in the AP mode. Then, the process proceeds to step 1000 in FIG. 10.

In the present embodiment, the playback devices 103, 104, and 105 send various types of request to the server 102 operating in the STA mode. When the playback devices 103, 104, and 105 have received a notification that the operation mode has been changed to the AP mode from the server 102, the playback devices 103, 104, and 105 disconnect connections to a connected AP, participate in a network established by the server 102, and resend a request for processing to the server 102. The subsequent steps are the same as those in the previous embodiment. Moreover, steps in the playback devices 103, 104, and 105 after the server 102 transitions to the AP mode are the same as those in the previous embodiment.

The server 102 can be activated in the STA mode and can perform communication via a wired network to which the AP 101 is connected, as described above. Moreover, when a large amount of data, such as music or video, is sent, communication can be performed with transmission parameters suitable for the nature of the data effectively using a communication band by changing the operation mode to the AP mode.

When the server 102 transitions to the AP mode, the server 102 does not unconditionally send a notification that the server 102 leaves the network of the AP 101 and can consider the presence of communications with the wired terminals 106 and 107. Specifically, the server 102 can consider whether the server 102 is providing media playback services to terminals in a wired network. This determination is made according to priorities assigned to a process of communication with a wired terminal and a process of communication with a wireless terminal (a playback device).

For example, when a user of the server 102 assigns a priority to a process of communication with a wired terminal in advance, the priority being higher than the priority assigned to a process of communication with a wireless terminal, the server 102 does not transition to the AP mode and returns a rejection response to a wireless terminal having sent a request to play back data.

It is determined based on the management information on communications whether any wired connection exists. For example, the status of the Transmission Control Protocol (TCP) stack is used as management information on communications. For example, when a port where the status of TCP is ESTABLISHED exists, the server 102 maintains connection to the AP 101 until the communication finishes. When a high priority is assigned to a process of communication with a wireless terminal, the server 102 disconnects a wired connection and transitions to the AP mode. In this way, the process of the server 102 is changed in a manner that depends on whether terminals operating as media renderers include wired terminals in addition to wireless terminals. In addition, when a server provides a plurality of types of content to another device, the content can be efficiently sent.

The present invention is achieved by an embodiment in which a storage medium that stores program code of software that implements the foregoing exemplary embodiments is provided to a system or a device, and a computer included in the system or the device reads and executes the program code stored in the storage medium. The computer includes a control unit, for example, a CPU or a micro processing unit (MPU). In this case, the program code read from the storage medium implements the foregoing exemplary embodiments, and thus the present invention includes the storage medium, which records the program code.

Media that can be used as storage media to supply the program code, include but are not limited to, a floppy disk, a hard disk, an optical disk, a magneto-optical disk, a CD-ROM, a CD Recordable (CD-R), a magnetic tape, a nonvolatile memory card, a ROM, and a DVD.

Moreover, an operating system (OS) operating on a computer may execute some or all of the actual processing to implement the foregoing exemplary embodiments according to instructions from the program code. The program code may be written to a memory included in a function expansion unit connected to a computer. Then, a control unit included in the function expansion unit may execute some or all of the processing to implement the foregoing exemplary embodiments according to instructions from the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-208497 filed Jul. 31, 2006, which is hereby incorporated by reference herein in its entirety.

What is claimed is:

1. A server providing a plurality of types of content to another device, the server comprising:
   a control device configured to function as a controller that establishes and controls a wireless network;
   a controlled device configured to function as a controlled component in a wireless network established and controlled by another controller; and
   a selection device configured to selectively execute an operation of the server as a controller via the control device or an operation of the server as a controlled component via the controlled device in response to a type of a request from the another device, wherein the request requests the server to provide at least one of the plurality of types of content, and an operational status of the control device or the controlled device,
   wherein the control device includes a changing device configured to change control conditions for controlling a communication channel upon providing at least one of the plurality of types of content to the another device in response to types and numbers of at least one of the plurality of types of content to be provided and at least one of the plurality of types of content being provided.

2. The server according to claim 1, further comprising:
   a determining device configured to determine whether to perform communication via a wired network in response to a type of a request from the another device,
   wherein, when the determining device determines to perform communication via a wired network when the server operates as a controller via the control device, the selection device changes an operational status of the server from an operational status in which the server operates as a controller via the control device to an operational status in which the server operates as a controlled component via the controlled device.

3. The server according to claim 1, further comprising:
   a determining device configured to determine whether at least one of the plurality of types of content requested to be provided from the other device is stored;
   wherein, when the server is in an operational status where the server operates as a controller via the control device and when the determining device determines that at least one of the plurality of types of content is not stored, the selection device changes an operational status of the server from an operational status in which the server operates as a controller via the control device to an operational status in which the server operates as a controlled component via the controlled device.

4. The server according to claim 1, wherein the selection device selectively executes an operation of the server as a controller via the control device or an operation of the server as a controlled component via the controlled device in response to a type of a request from the another device, wherein the request requests the server to provide at least one of the plurality of types of content, an operational status of the control device or the controlled device, and a communication status with devices other than the another device.

5. The server according to claim 1, wherein the selection device selectively executes an operation of the server as a controller via the control device or an operation of the server as a controlled component via the controlled device in response to a type of a request from the another device, wherein the request requests the server to provide at least one of the plurality of types of content, an operational status of the control device or the controlled device, and a priority assigned to a communication process with devices other than the another device, wherein the devices are in communication with the server.

6. A method for controlling a server that provides a plurality of types of content to another device, the method comprising:
   a function of establishing and controlling a wireless network;
   a function of being controlled in a wireless network established and controlled by another controller; and
   a function of selectively executing the function of establishing and controlling a wireless network or the function of being controlled in response to a type of a request from the another device, wherein the request requests the server to provide at least one of the plurality of types of content, and an operational status of the function establishing and controlling a wireless network or the function of being controlled,
   wherein the function of establishing and controlling a wireless network further includes a function to change control conditions for controlling a communication channel upon providing at least one of the plurality of types of content to the another device in response to types and numbers of at least one of the plurality of types of content to be provided and at least one of the plurality of types of content being provided.

7. A computer-readable storage medium storing computer-executable process steps, the computer-executable process steps causing a computer to execute the method of claim 6.

* * * * *